United States Patent [19]
Oh

[11] Patent Number: 5,698,861
[45] Date of Patent: Dec. 16, 1997

[54] SYSTEM FOR DETECTING A POSITION OF A MOVABLE OBJECT WITHOUT CONTACT

[75] Inventor: Ketsu Oh, Kobe, Japan

[73] Assignee: Konami Co., Ltd., Hyogo-ken, Japan

[21] Appl. No.: 509,314

[22] Filed: Jul. 31, 1995

[30] Foreign Application Priority Data

Aug. 1, 1994 [JP] Japan .................. 6-180289

[51] Int. Cl.$^6$ .................. H01J 40/14
[52] U.S. Cl. .................. 250/559.29; 250/559.32; 250/206.1; 348/262
[58] Field of Search .................. 250/559.29, 559.31, 250/559.32, 221, 203.3, 206.1; 348/147, 208, 262

[56] References Cited

U.S. PATENT DOCUMENTS

| | | | |
|---|---|---|---|
| 4,847,485 | 7/1989 | Koelsch | 250/221 |
| 4,965,453 | 10/1990 | Hoschette et al. | 250/203.3 |
| 5,196,689 | 3/1993 | Sugita et al. | 250/221 |
| 5,245,177 | 9/1993 | Schiller | 250/221 |
| 5,317,394 | 5/1994 | Hale et al. | |

FOREIGN PATENT DOCUMENTS

| | | |
|---|---|---|
| 63-015380 | 1/1988 | Japan . |
| 6478388 | 3/1989 | Japan . |
| 1112490 | 5/1989 | Japan . |
| 4032705 | 2/1992 | Japan . |
| WO9309523 | 5/1993 | WIPO . |

OTHER PUBLICATIONS

Taiwanese Publication: Applicable practice of sensor with figures, published in Feb. 1987.
Patent Abstracts of Japan, vol. 13, No. 353 (P-913), 8 Aug. 1989 & JP-A-01 112490 (Kenro Motada) 1 May 1989.

Primary Examiner—Edward P. Westin
Assistant Examiner—Kevin Pyo
Attorney, Agent, or Firm—Jordan and Hamburg

[57] ABSTRACT

A position detecting system for detecting a position of a movable object having a light emitter without contact, the system includes: a first light sensor which has a first view area and receives light from the light emitter of the movable object in the first view area to produce image data, and a second light sensor which has a second view area and receives light from the light emitter of the movable object in the second view area to produce image data, a combination of the first and second view areas covering a space in which the movable object moves, and the first and second view areas overlapping each other; and a processor which calculates a position of the movable object based on image data produced by the first and second light sensors.

8 Claims, 22 Drawing Sheets

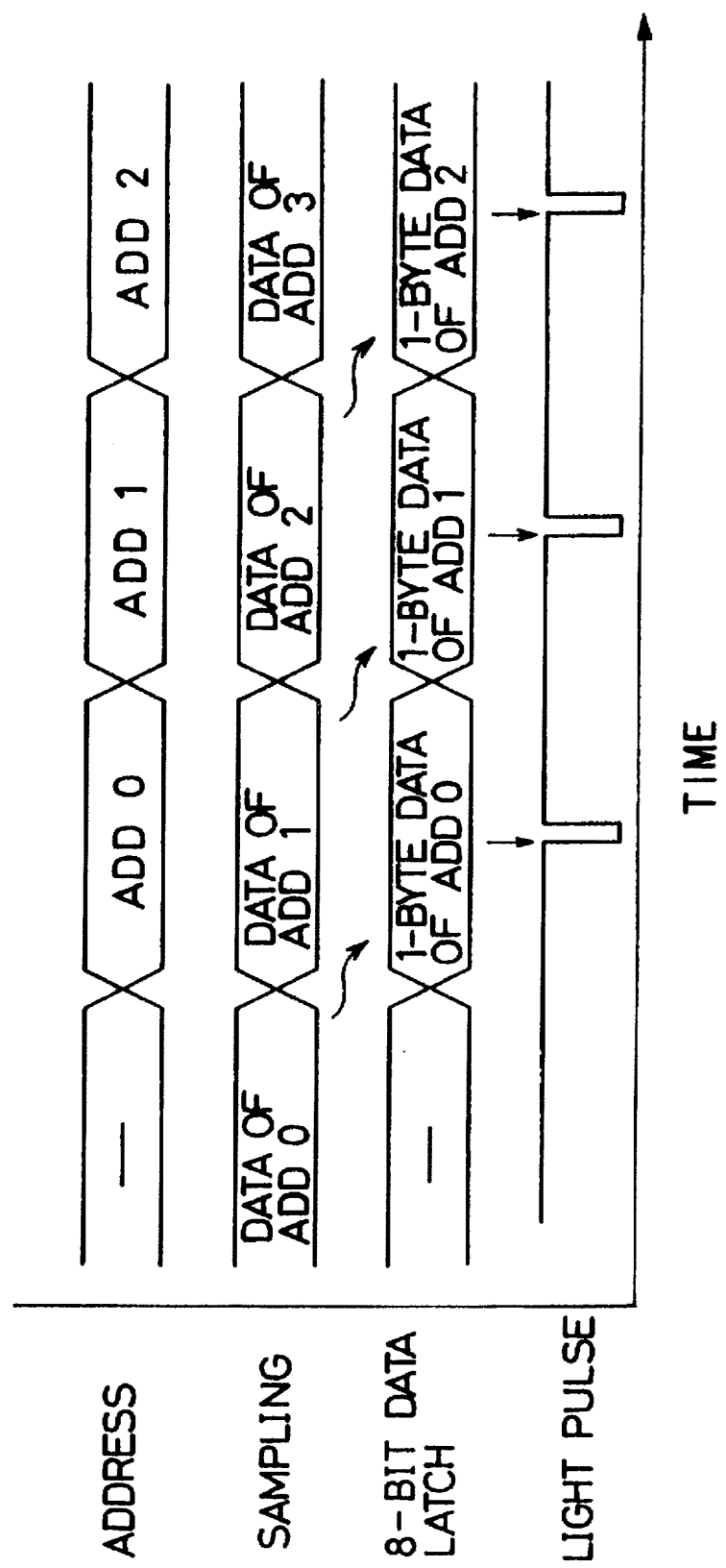

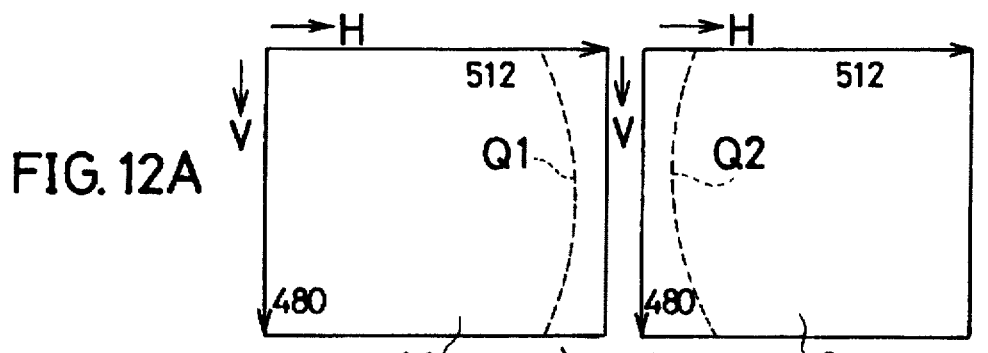
FIG. 12A
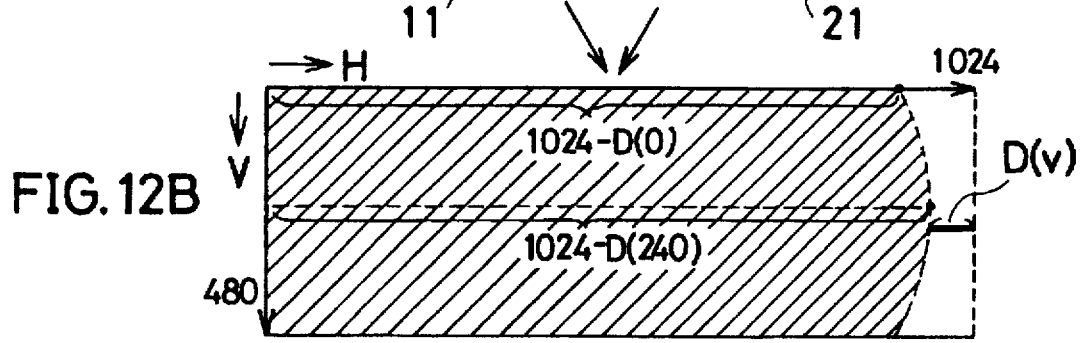
FIG. 12B
FIG. 13
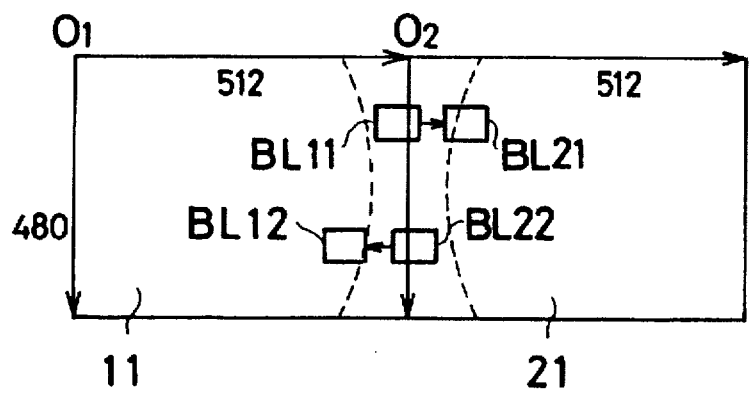

SYSTEM FOR DETECTING A POSITION OF A MOVABLE OBJECT WITHOUT CONTACT

BACKGROUND OF THE INVENTION

This invention relates to a system for detecting a position of a movable object which moves within a specified one-, two or three-dimensional range without contact with the movable object, and more particularly to a system for noncontactingly detecting a position of a movable object by using a plurality of light sensors.

Recently, there have been known so-called free track type racing game machines in which running bodies run while freely changing their tracks by itself, instead of the prior art racing game machines in which running bodies run along predetermined tracks. There have been, for example, proposed double-decker free track type game machines, in which running bodies which run between a track plate and a base having such a construction as to enable the position detection while having their positions detected, carry racing cars or horses which are moved on the track plate while being attached by magnets, etc. to the corresponding running bodies with the track plate between them (Japanese Unexamined Patent Publications Nos. 1-94884 and 1-259404).

However, the double-decker type game machines have the possibility that racing cars or the like running on the track plate are detached from the running bodies because of the inertial force acting at curves, the spinning, or the contact with the other racing cars. In such a case, the racing cars cannot run any further. Thus, there was a limit in realizing a free running on the track surface which resembles the real races. Further, movable bodies capable of moving in a three-dimensional manner cannot be applied to these double-decker type game machines. Furthermore, because of the complicated construction of the base for detecting the positions of the running bodies, it is difficult and expensive to manufacture such a game machine and change the size of the base. In addition, because of the mechanical or electrical contacts between the running bodies and the base, it is difficult to improve the reliability of the game machine and is cumbersome to conduct a maintenance.

In view thereof, there have been proposed handling toys which monitor from above a movable object provided with an emitter device which blinks at a high speed by means of a frame-scannable optical sensor, receive and identify an optical signal from the emitter device based on a combination of received images from the emitter device which are detected in a specified number of frames (Japanese Unexamined Patent Publication No. 1-112490).

In the handling toys capable of monitoring from above the movable bodies, the one frame-scannable optical sensor monitors movable bodies. Accordingly, the monitoring range is limited. Alternatively, it might be possible to expand the monitoring range by reducing the resolution of the sensor. However, this manner will inevitably reduce the detection accuracy.

SUMMARY OF THE INVENTION

It is an object of the present invention to provide a system for detecting a position of a movable object without contact with the movable object which has overcome the problems residing in the prior art.

It is another object of the present invention to provide a system for detecting a position of a movable object without contact with the movable object which can detect a position of an object movable in a larger space more accurately and easily.

The present invention is directed to a position detecting system for detecting a position of a movable object having a light emitter without contact, the system comprising: a first light sensor which has a first view area and receives light from the light emitter of the movable object in the first view area to produce image data, and a second light sensor which has a second view area and receives light from the light emitter of the movable object in the second view area to produce image data, a combination of the first and second view areas covering a space in which the movable object moves, and the first and second view areas overlapping each other; and a processor which calculates a position of the movable object based on image data produced by the first and second light sensors.

The processor may be constructed by first and second memories respectively provided for the first and second light sensors, each memory for storing image data produced by the corresponding light sensor; a position calculator which calculates a position of the movable object in the terms of a general address system unifying respective local address systems of the first and second memories, the position calculator including: a border address calculating device which calculates border addresses in the respective local address systems of the first and second memories, the border addresses corresponding to a border line defined in an overlap area of the first and second view areas; and an address converting device which converts addresses in the respective local address systems to those in the general address system based on the border addresses.

The position calculator may be further provided with a designator which designates an address block in the local address system of either the first memory or the second memory, the designated address block covering addresses bearing image data of the emitter provided on the movable object; a reader which reads image data within the designated address block; and a position calculating device which calculates a position of the movable object based on the read image data.

The designator may be made to designate an address block in the local address system of the first memory when a portion of an address block having been designated in the local address system of the second memory is beyond the border addresses of the second memory, and to designate an address block in the local address system of the second memory when a portion of an address block having been designated in the local address system of the first memory is beyond the border addresses of the first memory.

It may be preferable that each of the first and second light sensors includes an area sensor provided with photoelectric conversion elements arranged in a matrix; and the position calculating device includes: a counting portion which counts the number of photoelectric conversion elements which have received light from the light emitter of the movable object based on the image data read by the reader; a coordinate value accumulating portion which accumulates coordinate values of the photoelectric conversion elements counted by the counting portion; and a calculating portion which calculates a position of the movable object based on the counted number and the accumulated coordinate values.

The designator may be constructed by a moved amount calculating portion which calculates a moved amount of the movable object based on the calculated position of the movable object; and a designating portion which designates an address block based on a previously calculated position of the movable object and the calculated moved amount.

Each of the first and second light sensors may be preferably provided with a lens for focusing a light image on a surface of the light sensor.

It may be preferable that the light emitter is operable to emit light lying outside a frequency band for visible radiations; and each of the first and second light sensors is operable to receive only light lying in the same frequency band of light emitted by the light emitter.

With a position detecting system of the present invention, there is provided at least two light sensors. The view area of one light sensor overlaps the view area of another light sensor. Accordingly, an object moving in a large space can be reliably detected by two or more light sensors. Also, the detection space can be widened by increasing the number of light sensors.

The position calculator calculates a position of the movable object in the terms of a general address system unifying respective local address systems of the first and second memories. Addresses in the respective local address systems are converted to those in the general address system based on the border addresses by the address converting device. Accordingly, a movement of the object over the first and second view areas can be smoothly traced.

Also, the position calculator is provided with the designator to designate an address block in the local address system of either the first memory or the second memory. A position of the movable object is calculated based on image data within the designated address block. Accordingly, the position calculation can be performed at a higher speed.

The designation of an address block is changed from the first memory to the second memory, and vice versa based on the border addresses of each memory. An address block can be properly set with respect to a movement of the movable object.

The counting portion counts the number of photoelectric conversion elements which have received light from the light emitter based on the contents stored in the designated block. On the other hand, the coordinate value accumulating portion accumulates coordinate values of the photoelectric conversion elements counted by the counting portion. A position of the movable body is calculated based on the obtained count value and the accumulated coordinate value, which will consequently provide more accurate position at a higher speed.

An address block is set based on the previously calculated position and moved amount. There is provided the corrector which corrects the calculation result which has the influence of a distortion of the lens. Accordingly, more accurate position calculation can be attained.

The light emitter is allowed to emit light lying outside the band for the visible radiations, and the light sensor receives only the light lying the same frequency band of the light emitted by the emitter device. This will increase the preciseness in the position calculation.

These and other objects, features and advantages of the present invention will become more apparent upon a reading of the following detailed description and accompanying drawings.

BRIEF DESCRIPTION OF THE DRAWINGS

FIG. 7 is a timing chart showing an operation of the circuit shown in FIG. 6;

FIGS. 12A and 12B are diagrams showing how addresses in the frame memories are unified. FIG. 12A showing a state before address unification, FIG. 12B showing a state after the address unification;

FIG. 13 is a diagram showing an address conversion processing of a trace block BL;

DETAILED DESCRIPTION OF THE PREFERRED EMBODIMENTS OF THE INVENTION

Figure 1:
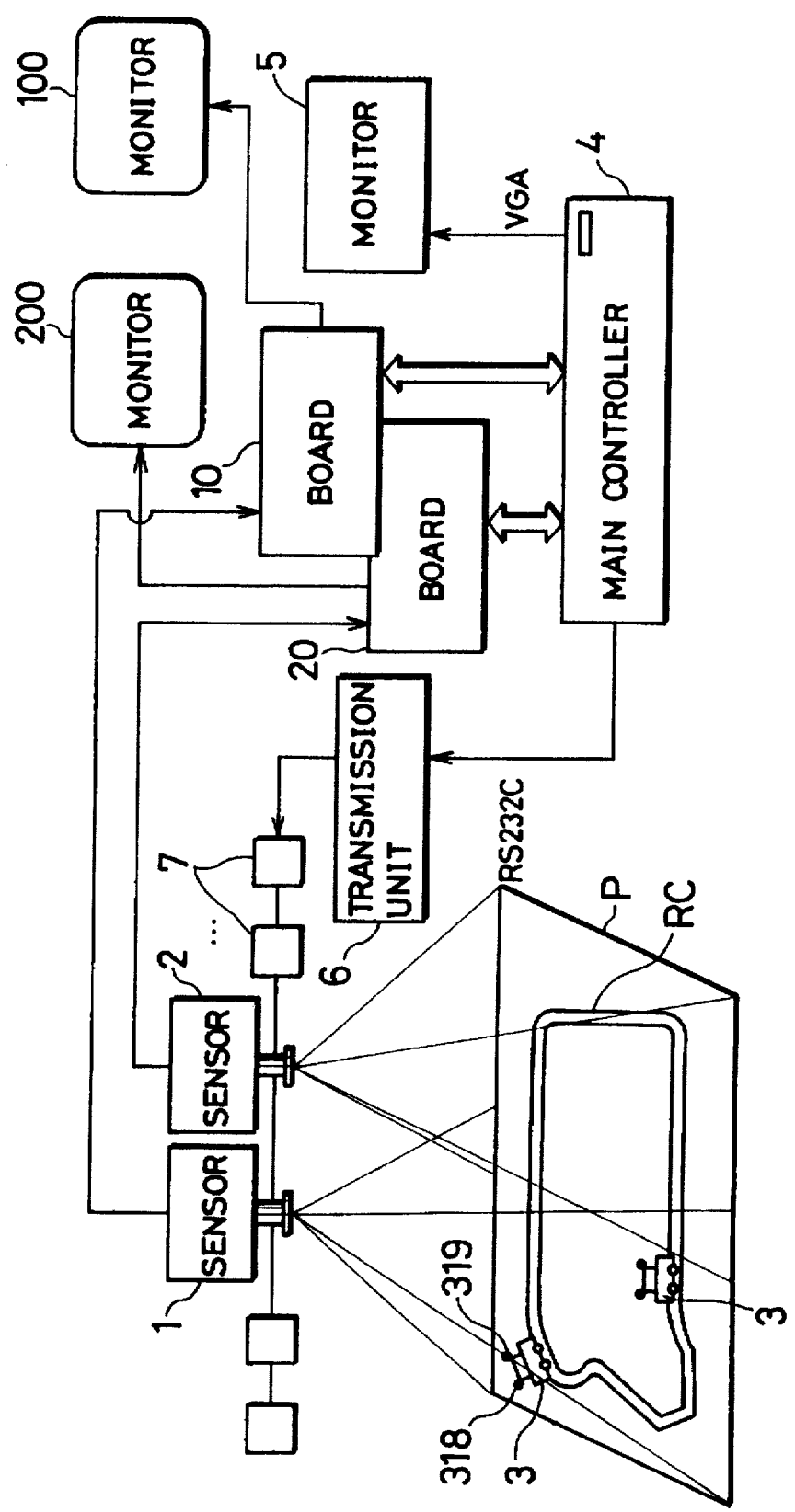
FIG. 1 is a perspective view showing an overall construction of a game machine embodying the present invention, together with a block diagram of the game machine.
Figure 2:
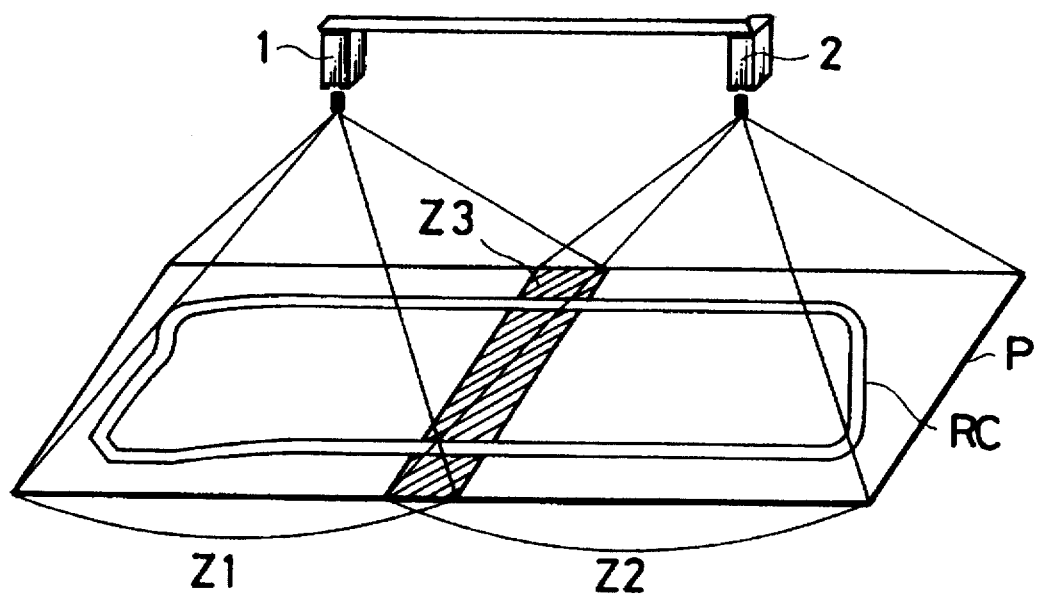
FIG. 2 is a perspective view showing a relationship between two areas viewed by two image pick-up devices or TV cameras.

FIG. 1 is a perspective view showing an overall construction of a game machine incorporating an inventive system for detecting a position of a movable object without contact with the movable object, and FIG. 2 is a perspective view showing a relationship between two areas viewed by two image pick-up devices.

This game machine includes a car 3 as a movable object and a machine main body. Each car 3 has wheels at front and rear sides thereof, and runs on a base P on which are drawn race tracks RC representing an automobile race circuit. The machine main body includes image pick-up devices 1, 2 including an area sensor of CCDs, electric boards 10, 20 provided with an electrical circuit for detecting a car 3, monitors 100, 200 respectively connected to the boards 10, 20, a main controller or processor 4, a game monitor 5, transmission LEDs 7 as data transmitter, and a transmission unit 6 provided between the main controller 4 and the LEDs 7. In this embodiment, television cameras are adopted as the image pick-up devices 1 and 2.

The main controller 4 centrally controls the overall operation of this game machine, and is provided internally with a microcomputer 40 (see FIG. 5), an unillustrated ROM in which game programs, course data, and race development data are stored in advance, and an unillustrated RAM for temporarily storing data being calculated and storing necessary parameters (including capability of racing cars). The microcomputer 40 calculates the position, speed and running direction of the car 3 based on the detection result as described later, and causes the game monitor 5, where the race track RC is displayed as a game development, to display the position of the car 3 as a specified mark which gives a real image of the running car 3 to game participants.

The course data includes position data which represents a predetermined running course along the race track RC drawn on the base P and is successively stored at a specified period in the form of H-coordinates and V-coordinates. In the case of running a plurality of cars 3, position data for each car 3 is provided. The data concerning the race development decides a ranking. There are a plurality of kinds of race developments. After a race is started, the race development is decided by means of a random generator, etc. Alternatively, in one race development, the position data may be randomly given to different cars 3 after the race is started. The main controller 4 has information on a race development set for each car 3, and gives a control signal to the car 3 in accordance with the set race development.

Further, this game machine is provided with a known construction required as a token betting game machine. Specifically, there are provided a device for calculating and displaying odds, a token insertion slot, a token detector, a device for allowing game participants to input their predicted rankings, a device for detecting the input rankings, a device judging which predictions are awardable, a device for calculating the number of awarding tokens, and a hand-over device for giving awarding tokens to the winner.

In this embodiment, as shown in FIG. 2, the base P is divided into two areas in a longitudinal direction, that is, a first area Z1 and a second area Z2. The first area Z1 and the second area Z2 have substantially the same area as each other. The TV camera 1 (2) is disposed a specified distance above the substantially center of the first area Z1 (second area Z2) of the base P with its image sensing surface faced downward so that the TV camera 1 (2) views the first area Z1 (second area Z2). Further, there is defined an overlap area Z3 in an intermediate portion of the base P. The overlap area Z3 is viewed by both TV cameras 1 and 2. In this way, the surface of the base P can be entirely viewed by the TV cameras 1 and 2.

As well-known, the TV camera 1 (2) includes a multitude of photoelectric conversion elements, i.e., CCDs, arranged in a matrix. The TV camera 1 (2) picks up an image at a selective specified period, e.g., either in a scanning cycle of 1/60 second (one field) or in a scanning cycle of 1/30 second (one frame). Electrical signals converted to have level corresponding to amounts of light received by the respective photoelectric conversion elements are output from the TV camera 1 (2). The TV camera 1 (2) used in this embodiment has an infrared transmitter filter disposed on its light receiving surface, so that it receives only the infrared radiations in a specified frequency band. This prevents an erroneous operation caused by external light. In this embodiment, the upper surface of the base P is divided into two areas and the two TV cameras 1, 2 pick up images in their corresponding areas. However, the upper surface of the base P may be divided into a plurality of areas more than two and the respective TV cameras may pick up images in their corresponding areas. In this way, the resolution of the picked up images, i.e., the position detection accuracy can be improved, while realizing the race track RC in an expanded area.

The boards 10, 20 are connected to the TV cameras 1 and 2, respectively. The boards 10, 20 each are internally provided with the electrical circuit for detecting the car 3, which will be described later with reference to FIGS. 4 and 5.

The monitors 100, 200 are not needed during the game, but are adapted to display auxiliary members for position adjustment, i.e., LED1, LED2 and LED3, which are used to adjust the direction of the TV cameras 1 and 2 in the production and maintenance, or to display a detecting state of the car 3 for confirmation.

The transmission LEDs 7 are light emitting devices for emitting, for example, infrared radiations. Similar to the TV camera 1 (2), the LEDs 7 are disposed at specified height from the base P with the light emitting portions faced downward. The infrared signals from the LEDs 7 are directed at the car 3 running on the race track RC and propagates while spreading at a specified angle. Only one transmission LED 7 may be disposed in the center position. In order to make the signal transmission reliable, two LEDs may be disposed to cover the respective areas defined by dividing the surface of the base P into two parts. In this embodiment, four LEDs are disposed serially to cover the respective areas defined by dividing the surface of the base P into four parts. With a plurality of LEDs 7, the transmission unit 6 transmits a synchronized optical pulse signal to the respective LEDs 7 connected in serial therewith. Thus, even if the areas covered by the respective LEDs 7 partially overlap, no interference occurs, with the result that the occurrence of erroneous operation can be prevented. In place of the connecting method shown in FIG. 1, the LEDs 7 may be connected in parallel so as to suppress the influence of impedance more effectively, or may be serially connected via drivers (using shield wires) so as to suppress the influence of impedance and to prevent the noise generation. The connecting method shown in FIG. 1 is advantageous as compared with the other connecting methods in that the wiring construction is simplified.

Figure 3:
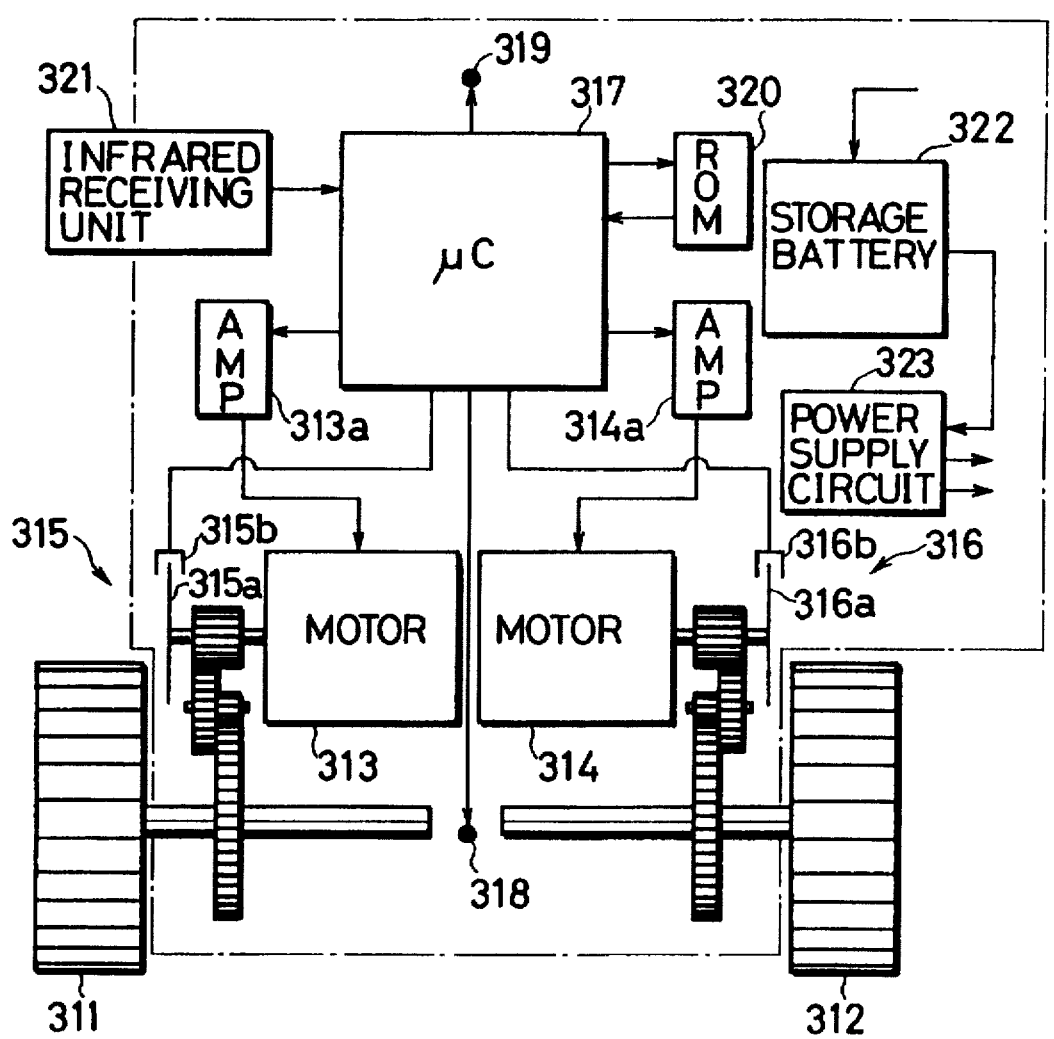
FIG. 3 is a block diagram showing a horizontal arrangement of main parts of a car.

FIG. 3 is a block diagram showing the construction of the car 3.

The car 3 has an unillustrated body, which has a so-called three-point support structure. In other words, wheels 311, 312 are rotatably mounted at the opposite lateral sides of the front side of the car body, and an unillustrated ball (ball caster) is disposed in the center of the rear (or front) side of the car body. This ball is fitted in a partially spherical hole which is formed on the bottom surface of the car body so as to volumetrically accommodate at least the half of the ball. The ball is rollable by 360 degrees. By adopting the three-point support structure, the slip of the car body can be effectively simulated. In place of the ball, rotatable wheels may be mounted at the opposite lateral sides.

The car 3 includes motors 313 and 314 for driving the wheels 311 and 312 formed of resin or like material, respectively. DC motors are used as the motors 313 and 314. The speed of the car 3 is duty-controlled and, if necessary, the car 3 is caused to run backward (by inverting the polarity of a supply current). Alternatively, pulse motors capable of controlling the speed using a pulse frequency may be used. A plurality of reduction gears are mounted between rotatable shafts of the motors 313 and 314 and those of the wheels 311 and 312 so that a specified speed range is obtainable. Further, rotating speed detectors 315 and 316 for detecting the rotating speed of the motors 313 and 314, respectively, are provided for to feedback-control of the speed of the car 3. The detectors 315, 316 include rotating plates 315a, 316a formed with perforations at specified intervals in their circumferential direction and which are rotatably mounted on the rotatable shafts of the motors 313 and 314, and photointerrupters 315b, 316b disposed to hold the rotating plates 315a, 316a therebetween to detect the perforations formed in the plates 315a, 316a, respectively.

Indicated at 317 is a one-chip microcomputer as a controller for the car 3. The microcomputer 317 analyzes the signals transmitted from the LEDs 7 of the machine main body to generate a running control signal for the car 3, and causes front and rear LEDs 318 and 319 to emit infrared radiations. An operation program is stored in a ROM 320. Indicated at 313a and 314a are amplifiers for amplifying the speed control signals output from the microcomputer 317 and sending the amplified signals to the motors 313 and 314, respectively.

As shown in FIGS. 1 and 3, the front LED 318 is disposed in the center of the front part of the car 3, whereas the rear LED 319 is disposed in the center of the rear part of the car 3. These LEDs 318 and 319 face straight above. The frequency band of the infrared radiations emitted from the LEDs 318 and 319 coincides with the transmission frequency band of the infrared transmitter filter disposed on the front surface of the TV cameras 1 and 2. The LEDs 318 and 319 are constructed such that the light emitted therefrom propagate while spreading at a wide angle. Thus, the image of the car 3, in any arbitrary position on the base P can be picked up by the TV cameras 1 and 2.

Referring back to FIG. 3, indicated at 321 is an infrared receiving unit which includes a photodiode or like device for receiving the optical pulse signals transmitted from the LEDs 7. The unit 321 is disposed, for example, in the middle of the top of the car 3 and faced upward. This photodiode is, for example, exposed so that it can receive the light from the wide range of directions. Indicated at 322 is a storage battery including a Ni—Cd battery capable of storing and releasing charges. This storage battery 322 is used as a battery for the car 3. Indicated at 323 is a stabilizing power supply circuit for generating, from a voltage from the storage battery 322, a voltage of 5 V necessary to operate the microcomputer 319 and a voltage of 6 V necessary to operate the motors 313 and 314.

Figure 4:
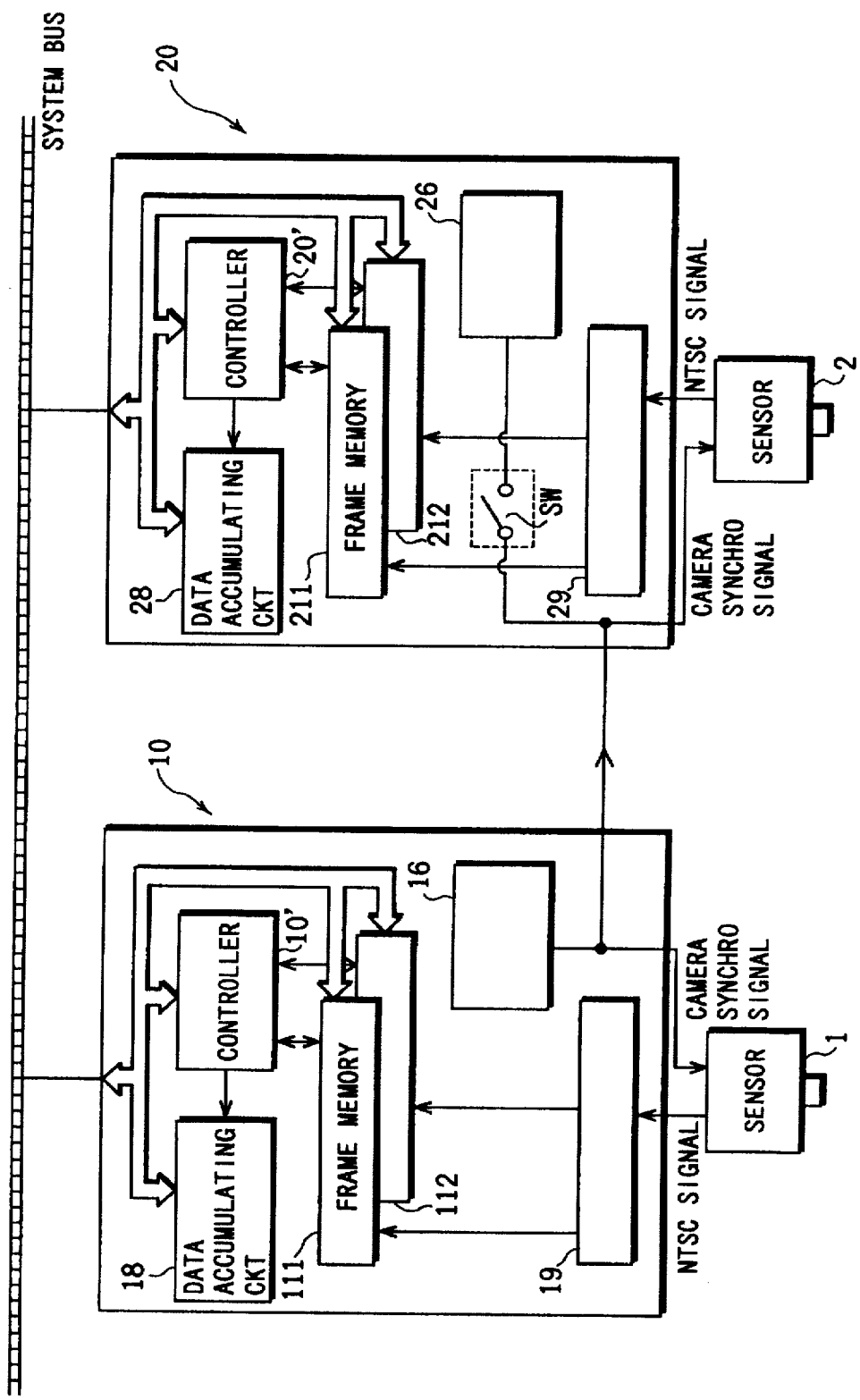
FIG. 4 is a schematic diagram showing a construction of electric boards provided with an electric circuit for detecting the position of the car.

FIG. 4 is a block diagram showing a construction of the boards 10 and 20.

As shown in FIG. 4, the arrangement of the board 20 is basically identical to that of the board 10 except that the board 20 is internally arranged with a switch SW for connecting and disconnecting the board 20 with and from the board 10.

When the board 20 is connected to the board 10 by turning the switch SW on, a synchronization signal and a camera synchronization signal which are sent from a TV camera controller 16 provided in the board 10 are transmitted to the board 20 to synchronously control the TV camera 2. On the other hand, in the case where the TV camera 2 is required to be used independently or to be controlled solely, e.g., when performing a maintenance operation, the board 20 is disconnected from the board 10 by turning the switch SW off to independently operate the board 20.

Components in the board 20 corresponding to those in the board 10 have the same functions as those in the board 10. It should be appreciated that principal components in the board 10 have the reference numerals 11 to 19, while those in the board 20 corresponding to the components having the reference numerals 11 to 19 have the reference numerals 21 to 29. Since the arrangement of the board 20 is basically identical to that of the board 10, the arrangement of the board 10 in association with the TV camera 1 will be discussed hereinafter, while the arrangement of the board 20 in association with the TV camera 2 will be omitted.

The, the board 10 (20) includes a controller 10'(20') for allowing frame memories 111 (211) and 112 (212) provided in a frame memory unit 11 (21) to be alternately written with image data from the TV camera 1 (2) or to be read to detect the position of the car 3.

Figure 5:
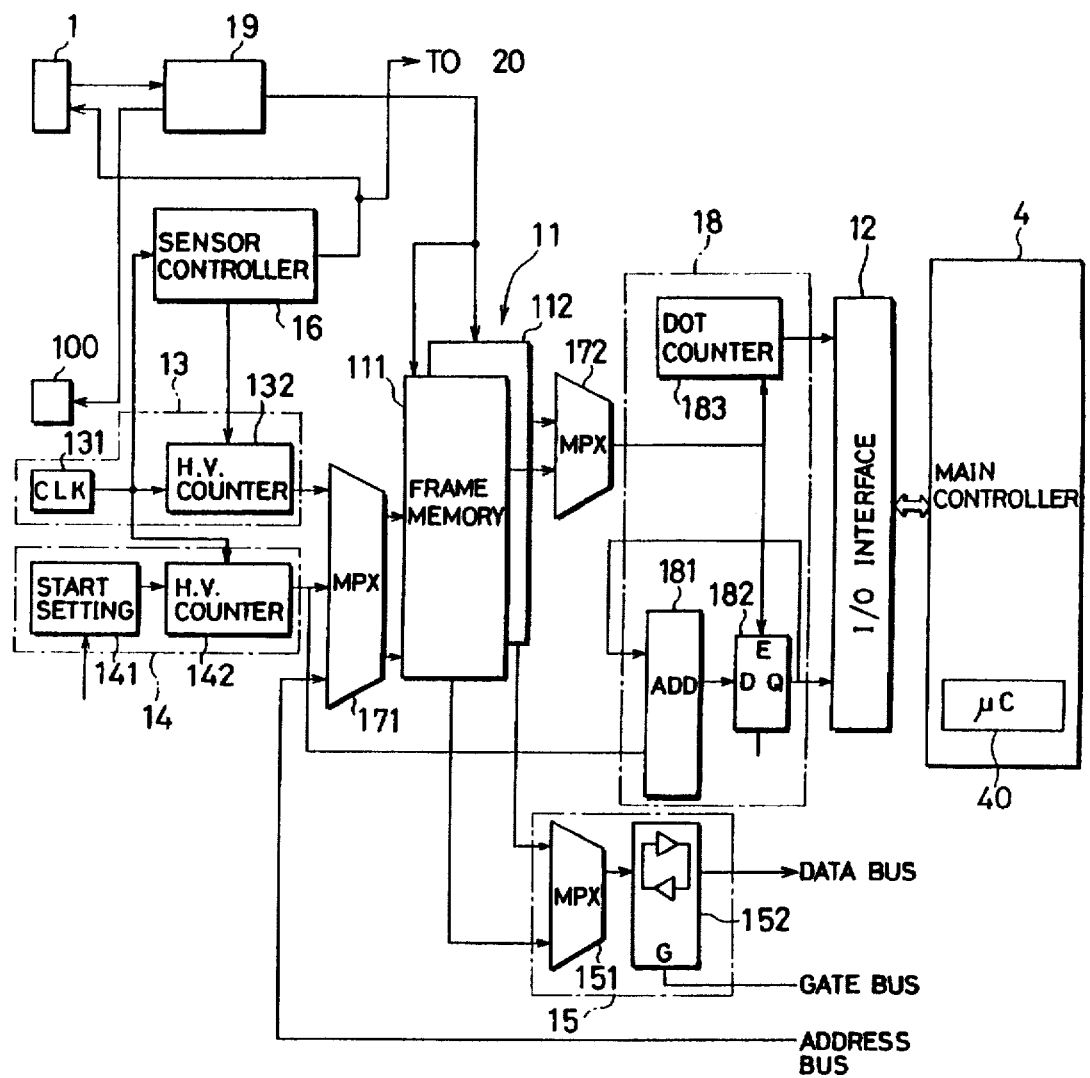
FIG. 5 is a block diagram showing a portion of a processor which detects the position of the car.

FIG. 5 is a block diagram showing a portion of the board 10 for detecting the position of the car 3. For the sake of easier explanation, the description of the board 20 will be omitted. In FIG. 5, the switch SW is not shown.

The binary processing circuit 19 converts an image on the base P which is picked up by the TV camera 1 into a binary data of high and low levels, and transfers the converted data to the frame memory unit 11. The binary processing circuit 19 is described in detail later with reference to FIG. 6. The frame memory unit 11 includes the frame memories 111 and 112 having a storage capacity coinciding with or corresponding to the number of the pixels of the TV camera 1. The frame memories 111 and 112 are alternately switched in specified cycles to store the image data. This cycle is selected either the field cycle (½ of the frame cycle) or the frame cycle.

Indicated at 13 is a write address generator for generating a write address of the frame memory unit 11. The address generator 13 includes, for example, a reference clock generator 131 for outputting a reference clock pulse of 14 Mhz and a H-, V-counter 132 for generating H-, V-addresses. The counter 132 outputs a write address for scanning all the addresses of the frame memory unit 11 at a speed synchronized with the field cycle. The counter 132 is adapted to write the binary data from the binary processing circuit 19 alternately in the frame memories 111 and 112.

Indicated at 14 is a read address generator for generating a read address for a specified area (hereinafter, referred to as a trace block) in the frame memory unit 11. The read address generator 14 includes a start setting circuit 141 for setting a starting position of the trace block, and a H-, V-counter 142. The generator 14 operates after an initial position recognition to be described later, and generates a read address of the trace block based on a start address (Hs, Vs) of the trace block and a trace block size data supplied from the microcomputer 40. In this way, the binary data only within the trace block are read.

Indicated at 15 is a data reading circuit for reading the binary data read in correspondence with the read address of the frame memory unit 11 output from the microcomputer 40 at the time of the initial position recognition, and outputting the read data to the microcomputer 40. The data reading circuit 15 includes a multiplexer 151 and a buffer 152. In the initial position recognition, there is a possibility that the data from the front and rear LEDs 318 and 319 may contain noise. The entire binary data in the frame memory unit 11 are processed by the microcomputer 40. The reading circuit 15 is provided to this end. More specifically, when a PC address is sent from the microcomputer 40, the binary data in the designated addresses are read one after another via the multiplexer 151, and are introduced to the microcomputer 40 via the buffer 152. The buffer 152 is adapted to output a parallel data of, e.g., 8 bits to the PC-address.

The TV camera controller 16 generates a synchronization signal and a camera synchronization signal in accordance with the reference clock from the reference clock generator 131. In accordance with these synchronization signals, the frame memories 111 and 112 are switched, and the cycle and timing of the scanning by the TV camera 1 are synchronized with the generation of the addresses of the frame memory. These signals are transmitted to the board 20 as described above.

Indicated at 171, 172 are multiplexer as switching circuits. The multiplexer 171 suitably switches the addresses from the counters 132, 142 and the PC-address from the microcomputer 40 and sends it to the frame memory unit 11. The multiplexer 172 switches outputs from the frame memories 111 and 112.

Indicated at 18 is a data accumulating circuit which includes an adding circuit 181, a latch circuit 182, a dot counter 183. The accumulation result is sent to the microcomputer 40, which in turn calculates the position of the car 3, the trace block and the running control data based on the received accumulation result.

Figure 6:
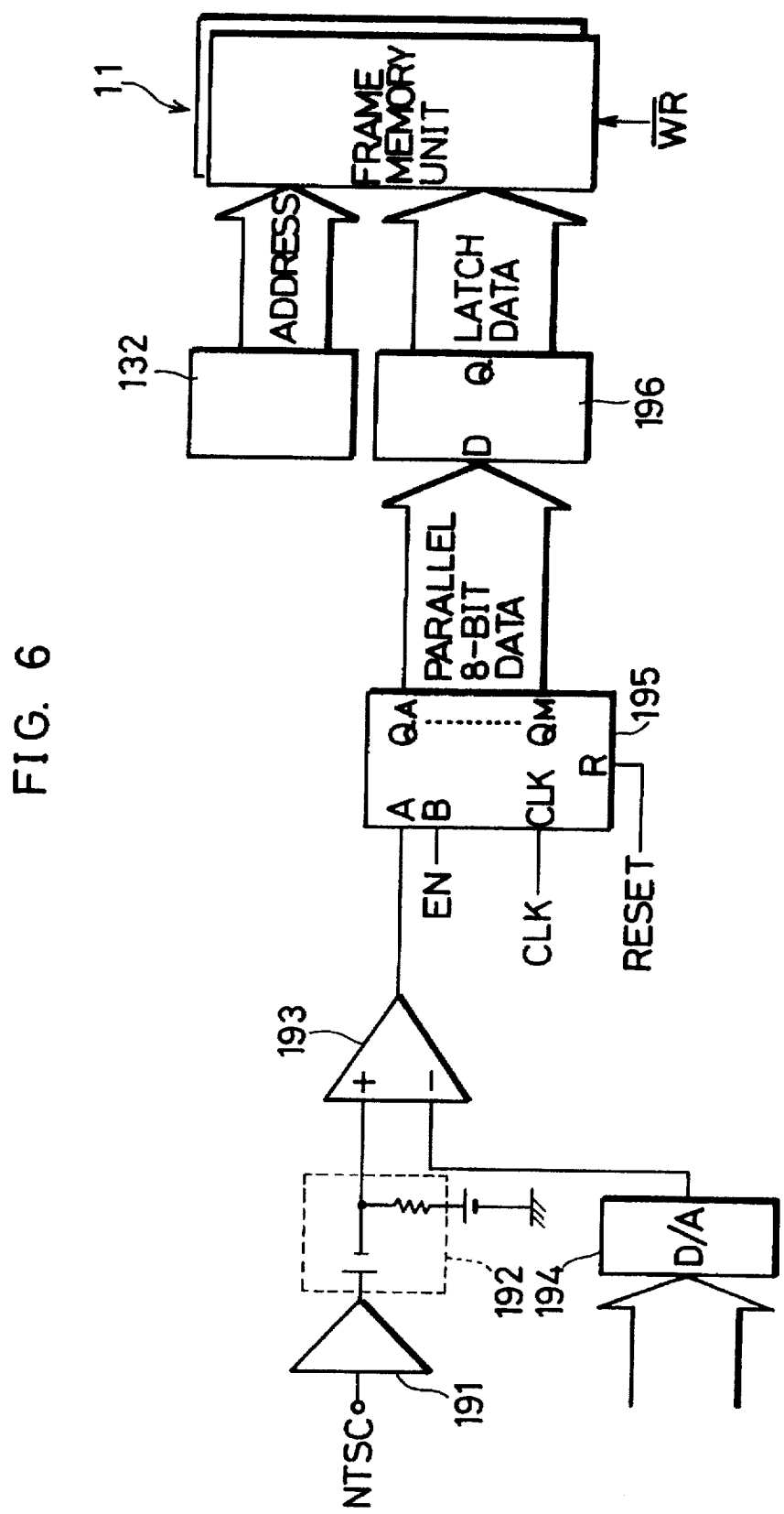
FIG. 6 is a detailed circuit diagram of a binary processing circuit.

FIG. 6 is a detailed circuit diagram of the binary processing circuit 19, and FIG. 7 is a timing chart showing its operation. In FIG. 6, indicated at 191 is an amplifier for amplifying an NTSC signal including image data from the TV camera 1 (2), and the thus amplified signal is converted into a signal having a specified voltage level by a circuit 192 including an AC coupling circuit. The thus converted signal is output to a noninverting input terminal of a comparator 193 including an operational amplifier. A D/A converter 194 is a digital-to-analog converting circuit and is adapted to convert a threshold data of, e.g., 8 bits input from the microcomputer 40 into an analog signal and to output the resultant signal to the inverting input terminal of the comparator 193. The comparator 193 outputs a signal of high level if the level of the NTSC signal is a threshold level or higher, and the output data thereof is sent to a serial parallel converter 195. The serial parallel converter 195 converts the received binary data into a data consisting of 8 bits in synchronization with a sampling clock and outputs the converted data to a latch circuit 196. The latch circuit 196 latches and outputs this signal to the frame memory unit 11. The binary parallel data is written in the frame memory unit 11 at a timing when a write pulse (bar WR) output during the reading of the data for 8 pixels is sent.

Accordingly, as shown in FIG. 7, the data is written such that the pixels of the TV camera 1 correspond to the addresses of the frame memory unit 11: the data from the first pixel (data of ADD0) is written in an address ADD0, a data of ADD1 in an address ADD1, a data of ADD2 in an address ADD2, and so on. The employment of the D/A converter 194 in the binary processing circuit 19 to compare the levels in an analog manner enables the use of a threshold data consisting of a larger number of bits as compared with a conventional case where the digital data are compared for the NTSC signal in the high frequency band. Thus, the resolution of the level comparison can be advantageously enhanced. It will be appreciated that the invention does not deny the employment of the conventional circuit construction for comparing the digital data, and that either one of the constructions is employed in view of a required resolution accuracy.

Figure 8A:
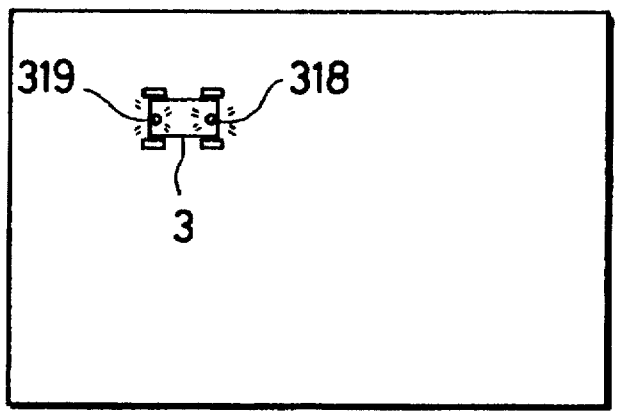
FIGS. 8A to 8C show an operation of a data reading circuit, FIG. 8A showing a base located within a view of one of the two cameras, FIG. 8B showing storage contents of a frame memory in the state shown in FIG. 8A, and FIG. 8C enlargedly showing a trace block BL1.
Figure 8B:
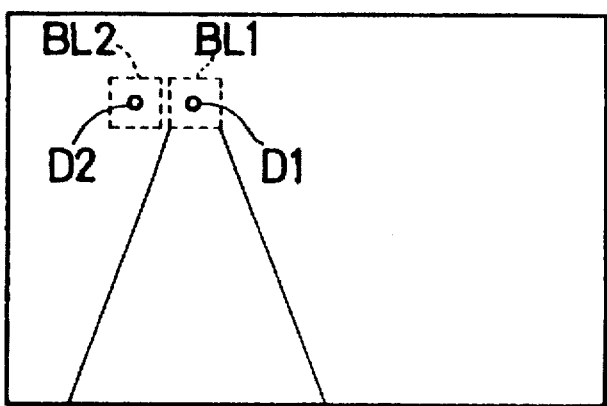
Figure 8C:
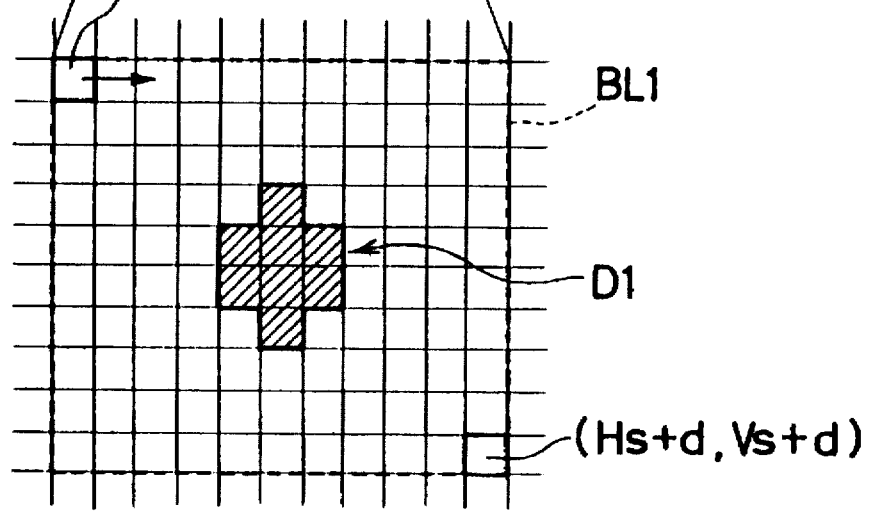

FIGS. 8A to 8C are diagrams showing the operation of the data reading circuit 18. FIG. 8A showing a base located within a view of a TV camera, FIG. 88 showing storage contents of a frame memory in the state shown in FIG. 8A, and FIG. 8C enlargedly showing a trace block BL1.

In FIG. 8A, one car 3 is located on the base P, and the front and rear LEDs 318 and 319 are on. In FIG. 8B, LED pixel data D1 and D2 corresponding to the front and rear LEDs 318 and 319 are stored at high level. BL1 and BL2 denote trace blocks.

In FIG. 8C, checkers within the trace block BL1 represent the pixels of the TV camera 1, i.e., the respective addresses of the frame memory unit 11. In this embodiment, there is adopted a square trace block having a side which is at least twice as long as a distance the car 3 moves in one field cycle (half the frame cycle). In this way, the movement of the car in 360° directions can be more securely traced. The upper left end (Hs, Vs) of the trace block BL1 is a starting address of the trace block BL1, which is set by the start setting circuit 141. The H-, V-counter 142 designates the addresses in a row direction (a direction indicated by an arrow in FIG. 8C) from the starting address (Hs, Vs), i.e., (Hs+1, Vs) . . . , (Hs+d, Vs). Upon the completion of one row, the address proceeds to the next row. The address designation ends at an end address (Hs+d, Vs+d). In this way, the trace block BL1 of d ×d (referred to as a trace block size BS hereinafter) is designated.

By selecting the shape of the focus lens disposed on the sensing surface of the TV camera 1 and the shape and luminance of the front and rear LEDs 318 and 319, the LED data D1 may be stored over a plurality of addresses (as in a hatched portion in FIG. 8C). By obtaining a plurality of dots, the LED data can be made distinguishable from other noises.

The integration is described with reference to FIGS. 5 and 8C. Upon the address designation of the trace block BL1 from the read address generator 14, stored contents of the addresses are successively read from the frame memory 111 (or 112). Simultaneously, the read addresses are sent to the adding circuit 181.

Each time one dot (high level data) as the LED data D1 is read from the frame memory 111, the count value of the dot counter 183 is incremented and the read dot is sent to the latch circuit 182. Only when receiving the dot data, the latch circuit 182 latches the address value output from the adding circuit 181 and sends the address value back to the adding circuit 181. In this way, each time the dot data is output from the frame memory 111, the address value for storing this dot data is output to the adding circuit 181 and integrated therein.

As a result, the number of dots existing in the trace block BL1 and the integration value of the addresses for these dots are obtained in the dot counter 183 and the latch circuit 182, respectively. Upon the completion of the address designation of the trace block BL1, the microcomputer 40 reads the data obtained in the latch circuit 182 and the dot counter 183, and judges based on the dot number whether the data is LED data or noise. A center address (Hc, Vc) of the dots is calculated by dividing the integration value by the dot number. The center address is assumed to be the position of the front LED 318. In accordance with this position data, the trace block is set and the running control signal for the car is generated.

The judgment as to whether the data is LED data or noise may be made as follows. A threshold dot number is set, and the data having the dot number which is not smaller than the threshold value is judged to be the LED data.

Further, the center address may be calculated by the hardware, and the H-, V-coordinates calculation results may be sent to the microcomputer 40. Instead of the use of absolute coordinates in calculating the integration value of the coordinates, relative coordinates from reference coordinates may be used. In this case, target coordinates are obtained by adding the reference coordinates to the obtained relative coordinates at the end. This is advantageous in that the number of bits to be used is reduced and the addition by the hardware can be performed at a higher speed.

It should be noted that the above processing is executed in the board 20 in similar to the board 10 when the car 3 is in the second area Z2 and the light from the LED 318 (319) is received by TV camera 2.

Referring to FIGS. 9 to 13, view adjustments of the TV cameras 1 and 2 and address conversion processing will be discussed.

Figure 9:
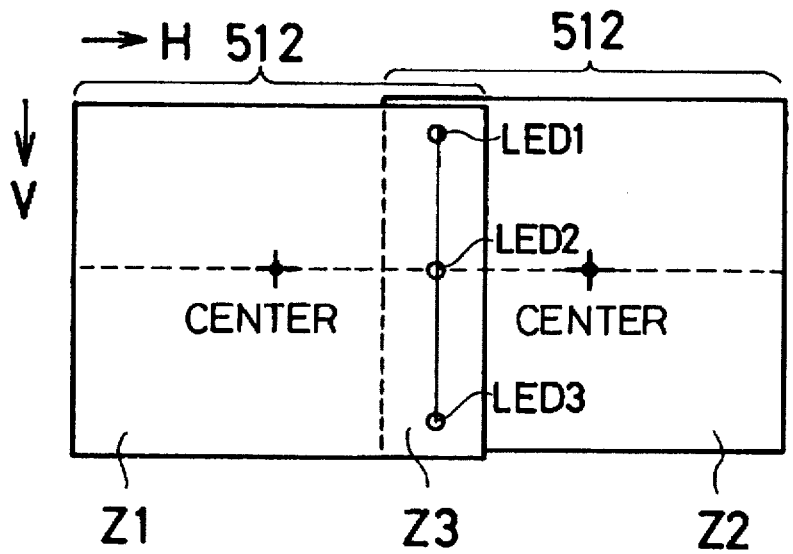
FIG. 9 is a plan view of the base provided with three LEDs for camera view adjustments.

FIG. 9 is a diagram showing respective views of the TV cameras 1 and 2 over the base P. In FIG. 9, the first area Z1 shows the view taken by the TV camera 1, the second area Z2 shows the view taken by the TV camera 2, and the overlap area Z3 shows the overlapping area of the first and second areas Z1 and Z2. A view defining member formed with a rectangular hole is provided either in front of or behind the focus lens of the TV cameras 1, 2 to obtain the first and second areas Z1 and Z2 having a substantially rectangular shape. For the sake of easier description, it should be noted that the respective sides of the first and second areas Z1 and Z2 are in parallel with a lengthwise direction (H-direction) and a widthwise direction (V-direction) of the base P. The LED1, LED2, and LED3 are disposed at a specified interval along a line which is in the V-direction in an intermediate portion of the overlap area Z3 defined in the base P.

Figure 10:
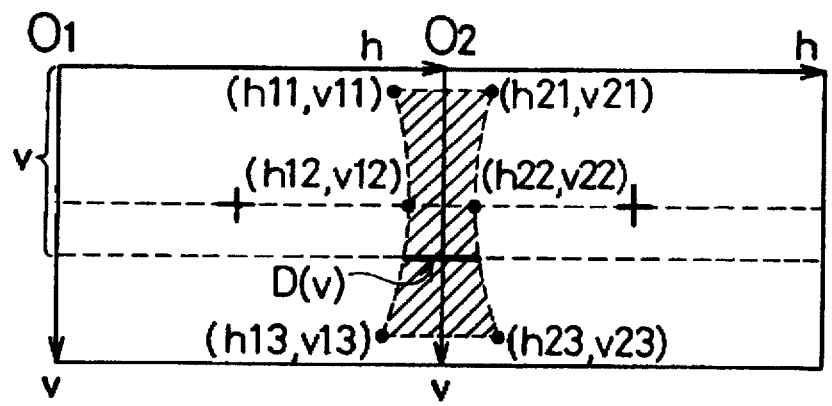
FIG. 10 is a diagram showing image data stored in frame memories after images of the three LEDs are picked up by the two cameras.

FIG. 10 shows image data of the LED1, LED2, and LED3 on the base P. The image data is produced by the TV cameras 1 and 2, and stored in the frame memory units 11 and 21. The TV cameras 1 and 2 are provided with a focus lens as usual cameras. The focus lens serves to focus a light image to a light reception element. Consequently, an image which is picked up by a camera provided with a focus lens is liable to be greatly distorted in its periphery due to the aberration of the focus lens.

The images of LED1, LED2, and LED3 which are picked up by the TV camera 1 are written at positions or addresses (h11, v11), (h12, v12), and (h13, v13) in the frame memory unit 11, respectively. The three images are on a curve Q1 (see FIG. 11). The images of the LED1, LED2, and LED3 which is picked up by the TV camera 2 are written at positions or addresses (h21, v21), (h22, v22), and (h23, v23) in the frame memory unit 21, respectively. The three images are on a curve Q2 (see FIG. 11).

Figure 11:
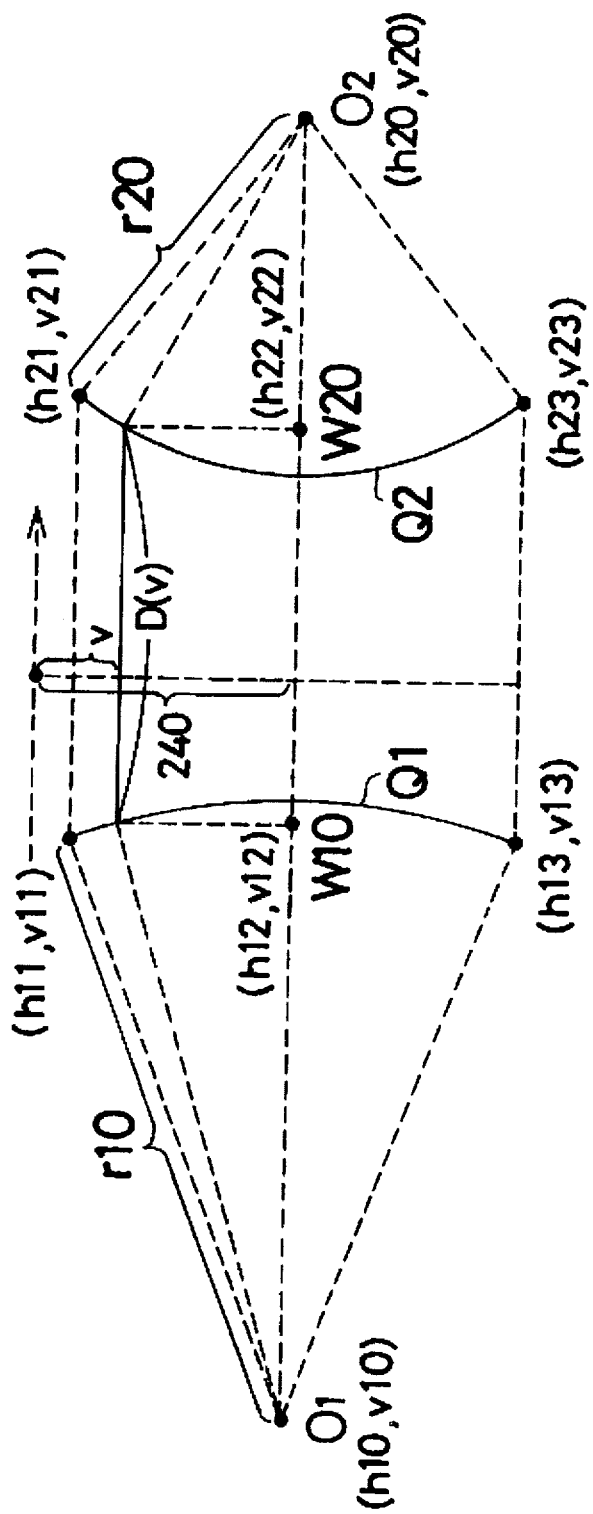
FIG. 11 is a geometrical diagram for calculating a distance D(v)

FIG. 11 is a diagram showing a geometry to calculate a distance D(v) which is the distance between the curves Q1 and Q2 in the H-direction. The curve Q1 (Q2) can be represented as an arcuate portion of a circle Q1 (Q2), and therefore the distance D(v) can be obtained by calculating equations for these circles. As the car 3 runs across the first and second areas Z1 and Z2, (in other words, across the frame memories 11 and 21), the distance D(v) is used to detect the position of the car 3.

It is necessary to calculate a radius r10 of the circle Q1 and a radius r20 of the circle Q2 and a center point 01 (h10, v10) of the circle Q1 End a center point 02 (h20, v20) of the circle Q2 in order to obtain the distance D(v). The data concerning the radius and center point are obtained by the following Equations 1 and 2, and the result of the calculation is stored in a system parameter memory. The distance D(v) is obtained by calculating Equation 3 based on the calculation results obtained by Equations 1 and 2.

EQUATION 1:

$$h10 = \frac{(h11^2 + v11^2)(v12 - v13) + (h12^2 + v12^2)(v13 - v11) + (h13^2 + v13^2)(v11 - v12)}{2 \cdot h11(v12 - v13) + 2 \cdot h12(v13 - v11) + 2 \cdot h13(v11 - v12)}$$

$$v10 = \frac{(h11^2 + v11^2)(h13 - h12) + (h12^2 + v12^2)(h11 - h13) + (h13^2 + v13^2)(h12 - h11)}{2 \cdot h11(v12 - v13) + 2 \cdot h12(v13 - v11) + 2 \cdot h13(v11 - v12)}$$

$$r10 = \sqrt{\{(h10 - h11)^2 + (v10 - v11)^2\}}$$

EQUATION 2:

$$h20 = \frac{(h21^2 + v21^2)(v22 - v23) + (h22^2 + v22^2)(v23 - v21) + (h23^2 + v23^2)(v21 - v22)}{2 \cdot h21(v22 - v23) + 2 \cdot h22(v23 - v21) + 2 \cdot h23(v21 - v22)}$$

$$v20 = \frac{(h21^2 + v21^2)(h23 - h22) + (h22^2 + v22^2)(h21 - h23) + (h23^2 + v23^2)(h22 - h21)}{2 \cdot h21(v22 - v23) + 2 \cdot h22(v23 - v21) + 2 \cdot h23(v21 - v22)}$$

$$r20 = \sqrt{\{(h20 - h21)^2 + (v20 - v21)^2\}}$$

EQUATION 3:

$$D(v) = |\overline{O1O2}| - (|\overline{O1W10}| + |\overline{O1W20}|)$$

$$= 512 + h20 - h10 - \sqrt{\{(h10 - h11)^2 + (v - v11)(2 \cdot v10 - v11 - v)\}} -$$

$$\sqrt{\{(h20 - h21)^2 + (v - v11)(2 \cdot v10 - v11 - v)\}}$$

It will be seen that the calculation is easier when the respective addresses of the LED1, LED2, and LED3 in the frame memory unit 11 is in agreement with those of the LED1, LED2, and LED3 in the frame memory unit 21 in the V-direction. This is because it is sufficient to execute address calculation in the H-direction only. Accordingly, the main controller 4 calculates respective addresses of the images of the LED1, LED2, and LED3 in the frame memory units 11 and 21 and causes the game monitor 5 to display their respective addresses in the V-direction. At the same time, the main controller 4 judges whether v11=v21, v12=v22, and v13=v23. If there is a disagreement in any of these three equations, the main controller 4 causes the monitor 5 to display the disagreement or other notification. At the notification of disagreement, an operator adjusts the view of both or either of the TV cameras 1 and 2. In this embodiment, each of the frame memory units 11 and 21 has 512 addresses in the H-direction and 480 addresses in the V-direction.

FIGS. 12A and 12B are diagrams showing an address unification of the LED1, LED2, and LED3 in the frame memory units 11 and 21. As shown in FIG. 12B, it is necessary to give the main controller 4 one address able to specify the position of the car 3 over the base P. Accordingly, a continuity is required with respect to image between the frame memory units 11 and 21. For this reason, in this embodiment, address unification is executed by removing addresses outside the curves Q1 and Q2 in the frame memory units 11 and 21, i.e., addresses in the right of the border line (curve Q1) in the frame memory unit 11 and addresses in the left of the border line (curve Q2) in the frame memory unit 21, as shown in FIG. 12A.

If a detected image is written at an address (FH, FV) of the frame memory unit 11, the address is used as a unified address. If a detected image is written at an address (FH, FV) of the frame memory unit 21, the address (FH, FV) is replaced with (FH=FH+512−D(v), FV). Accordingly, as shown in FIG. 12B, the unified addresses in the H-direction are (0) to (1024 −D(v)).

FIG. 13 is a diagram showing an address conversion of a trace block BL. When a trace block BL is set at a position beyond the curve Q1 (or Q2), in other words, a trace block BL is not within the address region of the frame memory unit 11 (or 21), the trace block BL which deviates from the frame memory unit 11 (21) is replaced with a new trace block BL, and the new trace block BL is set in the opposite frame memory unit 21 (or 11).

Specifically, in the case that the car 3 is detected by the TV camera 1 and the detected position is located at an address (FH, FV) of the frame memory unit 11, if a start address (SH, SV) of a trace block BL11 for the car 3 is within an address range (FH+BS/2≦512) without correction, the trace block BL11 is traceable in the frame memory unit 11. Accordingly, the start address (SH) in the H-direction of the trace block BL11 is calculated as SH =FH BS/2. If a start address (SH, SV) of a trace block BL11 for the car 3 is not in the address range, a portion of the trace block BL11 will go out of the frame memory unit 11, in other words, the address of the trace block BL11 will not be set in the frame memory unit 11. Accordingly, the start address (SH) in the H-direction of the trace block BK11 is calculated as: SH=512−FH+D(v)−BS/2. Consequently, the trace block BL11 is replaced with a new trace block BL21 which is traceable in the frame memory unit 21.

On the contrary, in the case that the car 3 is detected by the TV camera 2 and the detected position is located at an address (FH, FV) of the frame memory unit 21, if a start address (SH, SV) of a trace block BL22 for the car 3 is within an address range (FH −BS/2 ≧0) without correction, the trace block BL22 is traceable in the frame memory unit 21. Accordingly, the start address (SH) in the H-direction of the trace block BL22 is calculated as SH =FH −BS/2. If a start address (SH, SV) of a trace block BL22 for the car 3 is not in the address range, a portion of the trace block BL22 will go out of the frame memory unit 21, in other words, the address of the trace block BL22 will not be set in the frame memory unit 21. Accordingly, the start address (SH) in the H-direction of the trace block BK22 is calculated as: SH=512+FH−D(v)−BS/2. Consequently, the trace block BL22 is replaced with a new trace block BL12 which is traceable in the frame memory unit 11.

It should be noted that in either case, the start address (SV) in the V-direction is calculated as: SV =FV −BS/4. Further, it should be noted that this unification can be performed under the condition of BS≦min (D(v)).

In this way, the trace block BL can be properly set irrespective of the detected position of the car 3, thereby enabling secure trace of the car 3.

Figure 14:
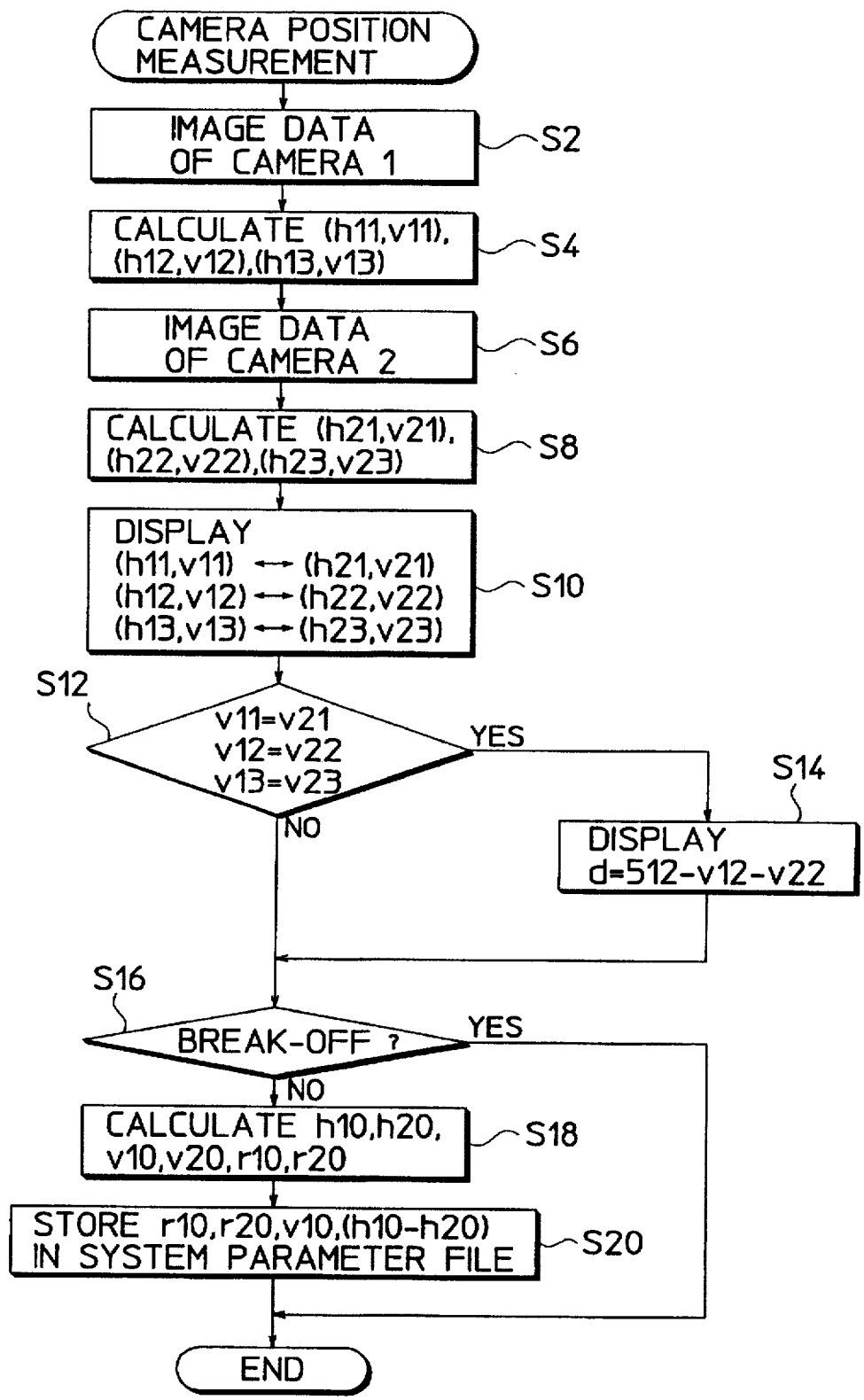
FIG. 14 is a flowchart showing a position measurement operation of the cameras.

FIG. 14 is a flowchart showing a measurement of the position of the TV cameras 1 and 2.

The TV cameras 1 and 2 are positioned to pick up images of the LED1, LED2, and LED3 which are disposed at the predetermined positions of the base P. The microcomputer 40 first renders the TV camera 1 pick up images of the LED1, LED2, and LED3 and then write their respective image data in the frame memory unit 11 (Step S2). The microcomputer 40 calculates addresses (h11, v11), (h12, v12), and (h13, v13) of images of the LED1, LED2, and LED3 by scanning the frame memory unit 11 (Step S4). Specifically, the address calculation is executed as follows: the frame memory unit 11 is scanned; the continuity of dots (high level data) is detected using a known method; the number of dots in a detected continuity region is counted; and a center position of the region is calculated. This calculation is similar to an initial position recognition which will be described later.

Similarly, the microcomputer 40 renders the TV camera 2 pick up images of the LED1, LED2, and LED3 and then write their respective image data in the frame memory unit 21 (Step S6). The microcomputer 40 calculates addresses (h21, v21), (h22, v22), and (h23, v23) of images of the LED1, LED2, and LED3 by scanning the frame memory unit 21 (Step S8).

Subsequently, a segment connecting the point (h11, v11) and the point (h21, v21), a segment connecting the point (h12, v12) and the point (h22, v22) and a segment connecting the point (h13, v13) and the point (h23, v23) are displayed on the game monitor 5 (Step S10). It is judged whether v11 =v21, v12 =v22, v13 =v23 (Step S12). If it is judged that v11 =v21, v12 =v22, and v13 =v23 (YES in Step S12), a distance d between the addresses (H12, V12) and (H22, V22) of the images of the LED2 is calculated as: d=512−v12−v22, and the calculated distance d is displayed (Step S14).

In Step S16, it is judged whether a break-off key is turned on (Step S16). The break-off key is provided in the operation panel. This judgment is performed because there is the possibility that an operator requests break-off of this flow to adjust the position of the TV cameras 1 and 2 after obtaining the results of Steps S12 and S14, i.e., when it is judged that the condition of v11 =v21, v12 =v22, v13 =v23 cannot be attained, or when it is found that the calculated distance d is not within the predetermined value. As mentioned above, the conditions of v11 =v21, v12 =v22, v13 =v23 and BS ≦ min (D(v)) are necessary for the address unification. If it is judged that the break-off is requested (YES in Step S16), this routine ends.

It may be appreciated that the operations of Steps S2 to S14 is repeated after the adjustment of the TV cameras 1 and 2 is completed and the break-off key is turned on again.

If it is judged that v11 =v21, v12 =v22, and v13 =v23 (YES in Step S12), and it is found that the distance d is within the predetermined value, and the break-off key is not turned on (NO in Step S16), the value h10, h20, v10, v20, r10, and r20 are calculated based on Equations 1 and 2(Step S18). Thus calculated r10, r20, v10, and (h10 −h20) are stored in the system parameter file (Step S20), and this routine ends.

Figure 15:
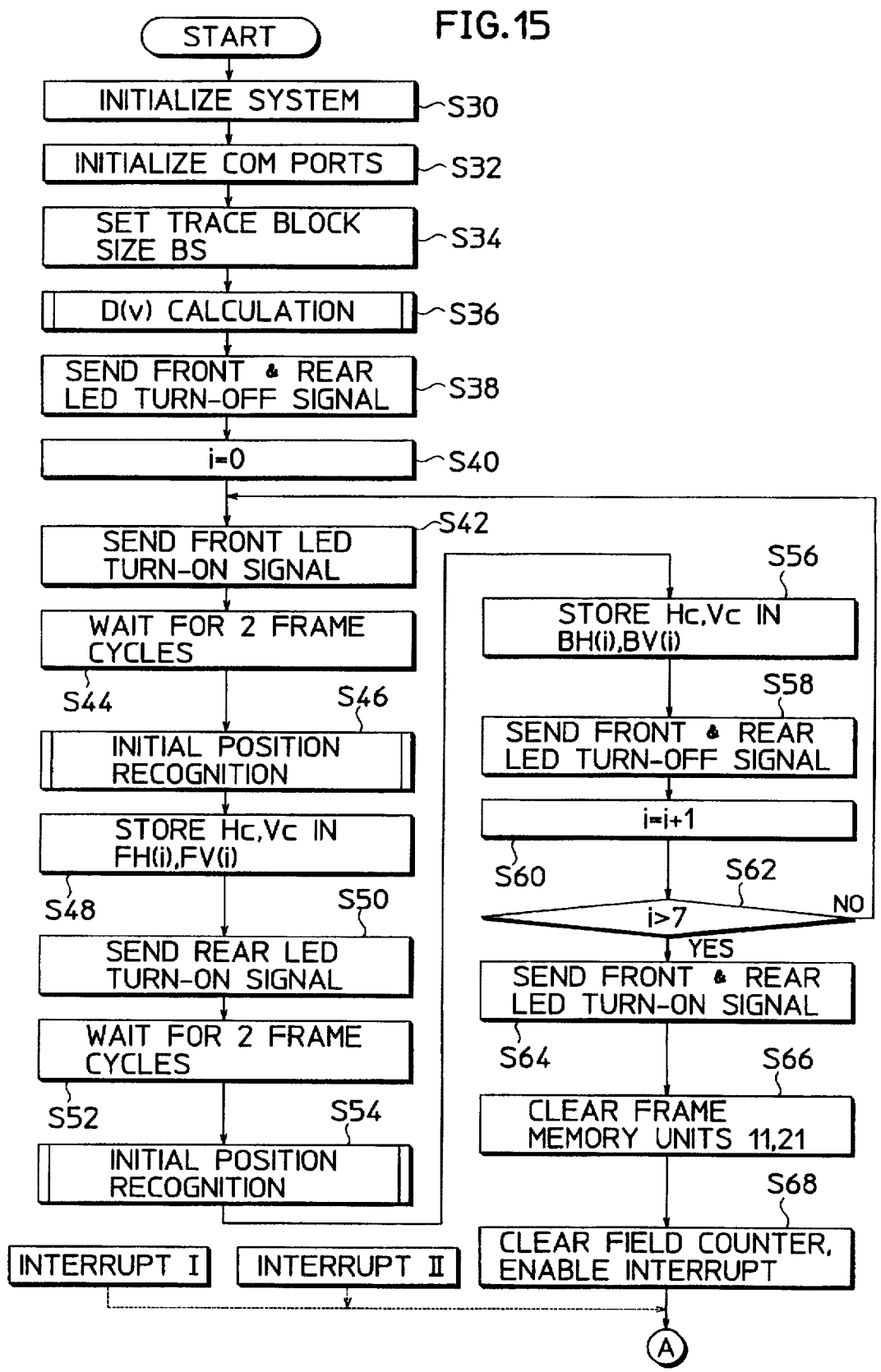
FIGS. 15 and 16 are a flowchart showing a main routine of the game machine.
Figure 16:
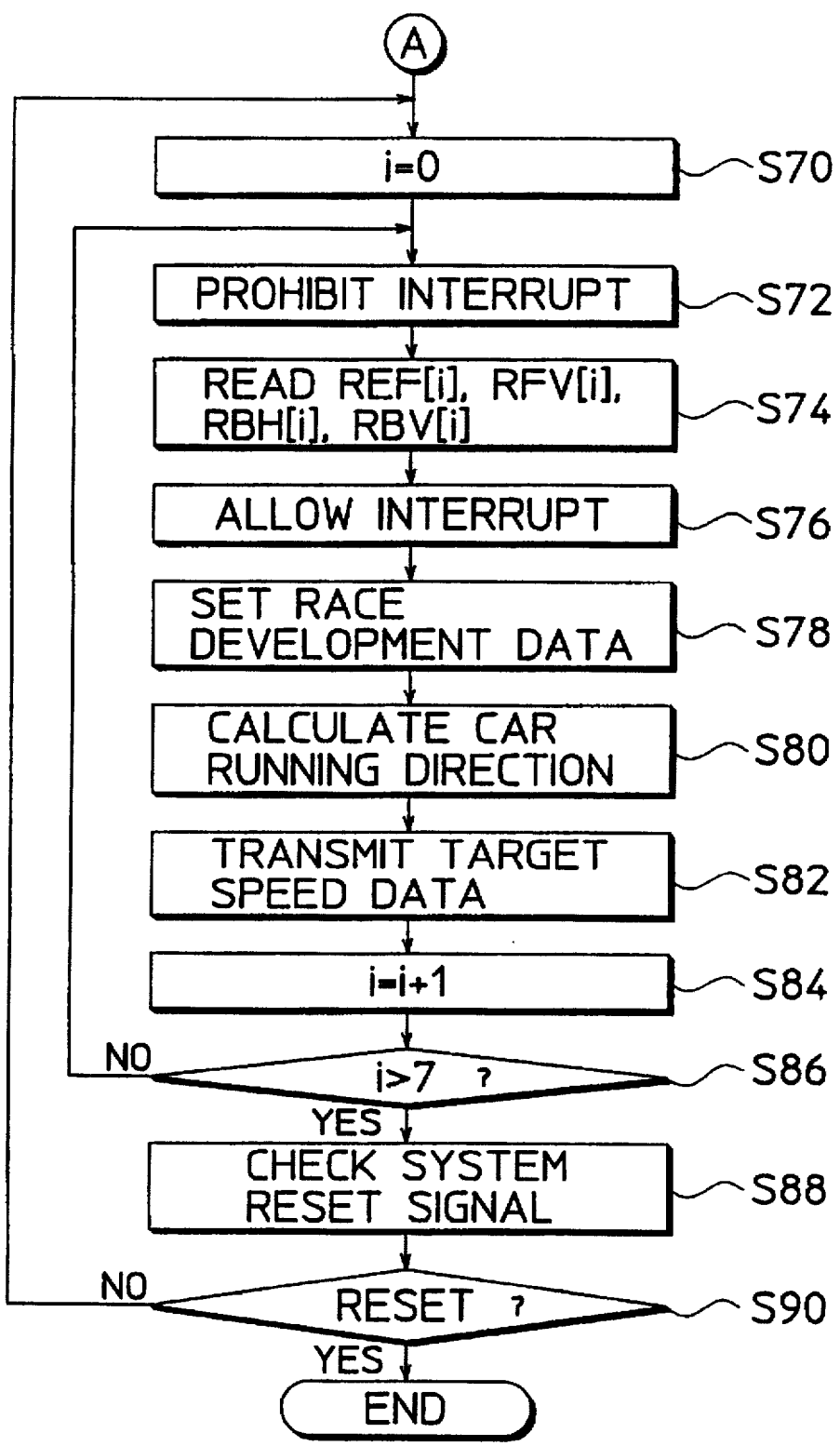

FIGS. 15 and 16 are a main flowchart showing operations of the game machine provided with the system for detecting the position of the movable object in a non-contact state. In this game machine, e.g., 8 cars are used and identification numbers ID No.i (i=0 to 7) are given in advance to the respective cars 3 by setting dip switches provided therein.

This flowchart starts after the specified operation, e.g., insertion of a medal, or input of a predicted ranking is detected and the race development is set. First, the entire system is initialized, and the communication ports of the microcomputer 40 and the main controller 4 are initialized (Steps S30 and S32). The trace block size BS is set (Step S34), and the distance D(v) is calculated (Step S36). The calculation of the distance D(v) will be described later.

Command signals are generated to turn off the front and rear LEDs 318 and 319 of all the cars 3, and are sent to all the cars 3 via the transmission LEDs 7 (Step S38).

A count value i of the counter is set to 0 (Step S40), and a command signal is generated to turn on the front LED 318 of the car of ID No. 0, and is transmitted to this car via the transmission LEDs 7 (Step S42). The microcomputer 317 of the car of ID No. 0 recognizes that the transmission command is directed to it, and turns only the front LED 318 on. On the other hand, after waiting for a time which is required for the luminance of front LED 318 to reach a specified level, e.g., for a time corresponding to 2 frame cycles following the transmission of the command signal (Step S44), the microcomputer 40 calculates the center of gravity position to recognize an initial position of the front LED 318 of the car of ID No. 0 (Step S46). This center of gravity position calculation is described in detail later. The obtained center of gravity data (Hc, Vc) is stored in the form of FH[i], FV[i](F denotes forward) in a RAM or the like as a buffer (Step S48).

Upon the completion of the storage of the center of gravity data, a command signal is generated to turn on the rear LED 319 of the car of ID No. 0, and is transmitted to this car via the transmission LEDs 7 (Step S50). The microcomputer 317 of the car of ID No. 0 recognizes that the transmission command is directed to it, and turns only the rear LED 319 on (in other words, the microcomputer 317 of the car of ID No. 0 turns the front LED 318 off). On the other hand, after waiting for 2 frame cycles following the transmission of the command signal (Step S52), the microcomputer 40 calculates the center of gravity to recognize an initial position of the rear LED 319 of the car of ID No. 0 (Step S54). The obtained center of gravity data (Hc, Vc) is stored in the form of BH[i]. BV[i](B denotes back) in a RAM or the like (Step S56). Upon the completion of the storage of the center of gravity data of the front and rear LEDs 318 and 319, command signals are generated to turn off the front and rear LEDs 318 and 319 of the car of ID No. 0 and are sent to this car via the transmission LEDs 7 (Step S58). Consequently, the front and rear LEDs 318 and 319 of the car of ID No. 0 are turned off.

Subsequently, the count value of the counter i is incremented by 1 (Step S60) and it is judged whether the count value i is in excess of 7 (Step S62). If i≦7 (NO in Step S62), this routine returns to Step S42 to carry out the aforementioned operations to the car of ID No. 1 . . . , the car of ID No. 7. The center of gravity data for the respective cars are thus obtained and stored. If i>7 (YES in Step S62), the command signal is generated to turn on the front and rear LEDs 318 and 319 of all the cars of ID No. 0 to 7 and is sent to all the cars via the transmission LEDs 7 (Step S64).

Upon the completion of the initialization, the tracing is prepared. First, the frame memory units 11 and 21 are cleared (Step S66). Then, respective field counters for switching designation of the frame memories 111 and 112 in the frame memory unit 11 and designation of the frame memories 211 and 212 in the frame memory unit 21 are cleared to enable an interrupt, and this routine waits for an interrupt (Step S68).

Figure 17:
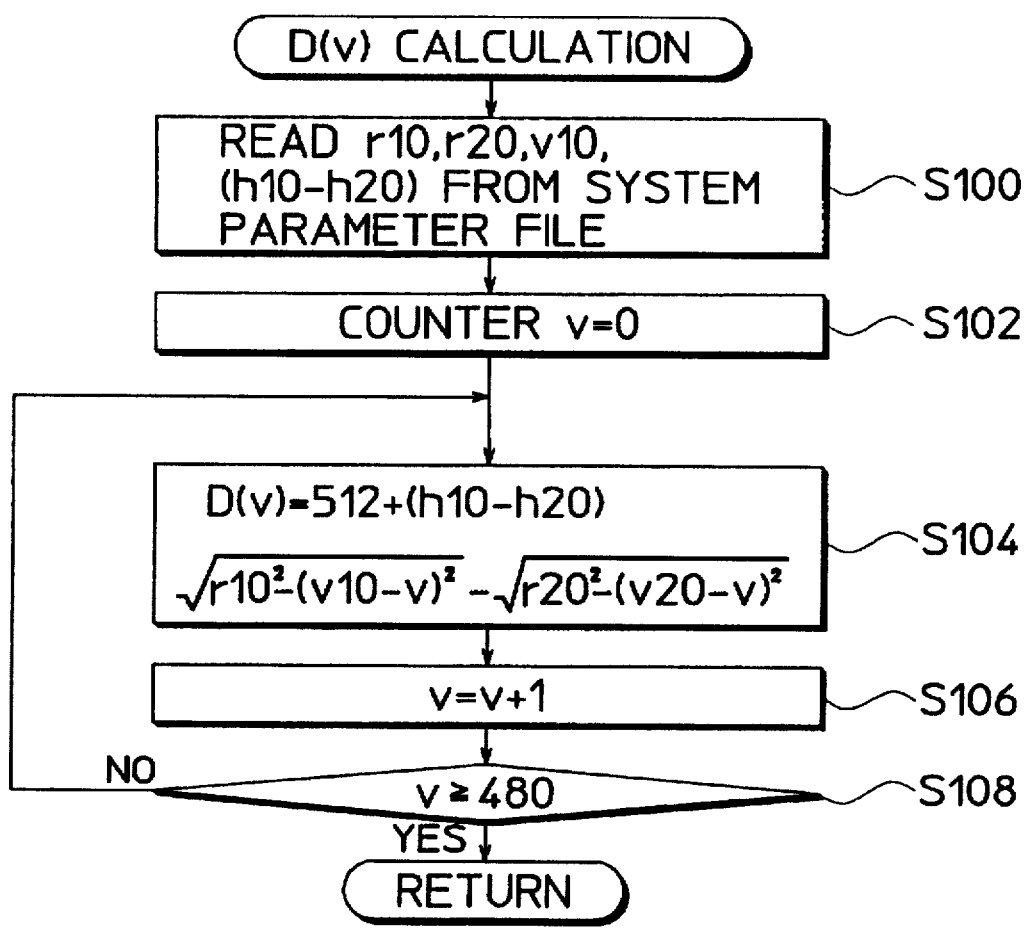
FIG. 17 is a flowchart showing a subroutine "D(v) calculation"

FIG. 17 is a flowchart of a subroutine "Calculation of Distance D(v)" in Step S36.

First, the value of r10, r20, v10, and (h10–h20) are read from the system parameter file (Step S100), and the internal counter v is set at "0" which designates the address in the V-direction in the frame memory units 11 and 21 (S102). The distance D (0) is calculated from Equation 3 (Step S104). Subsequently, the counter v is incremented by 1(Step S106). It is judged whether the count value v exceeds 480, namely, the number of addresses in the V-direction in the frame memory units 11 and 21 (Step S108). If the count value v is not in excess of 480, this subroutine returns to Step S104 and the distance D (1) is calculated. The calculation is repeated until the count value v becomes 480, i.e., until the distance D (480) is calculated (YES in Step S108). The calculation results are stored in the system parameter file in correspondence with the count value v, and are utilized in the initial position recognition and the interrupt II which will be described later.

Figure 18:
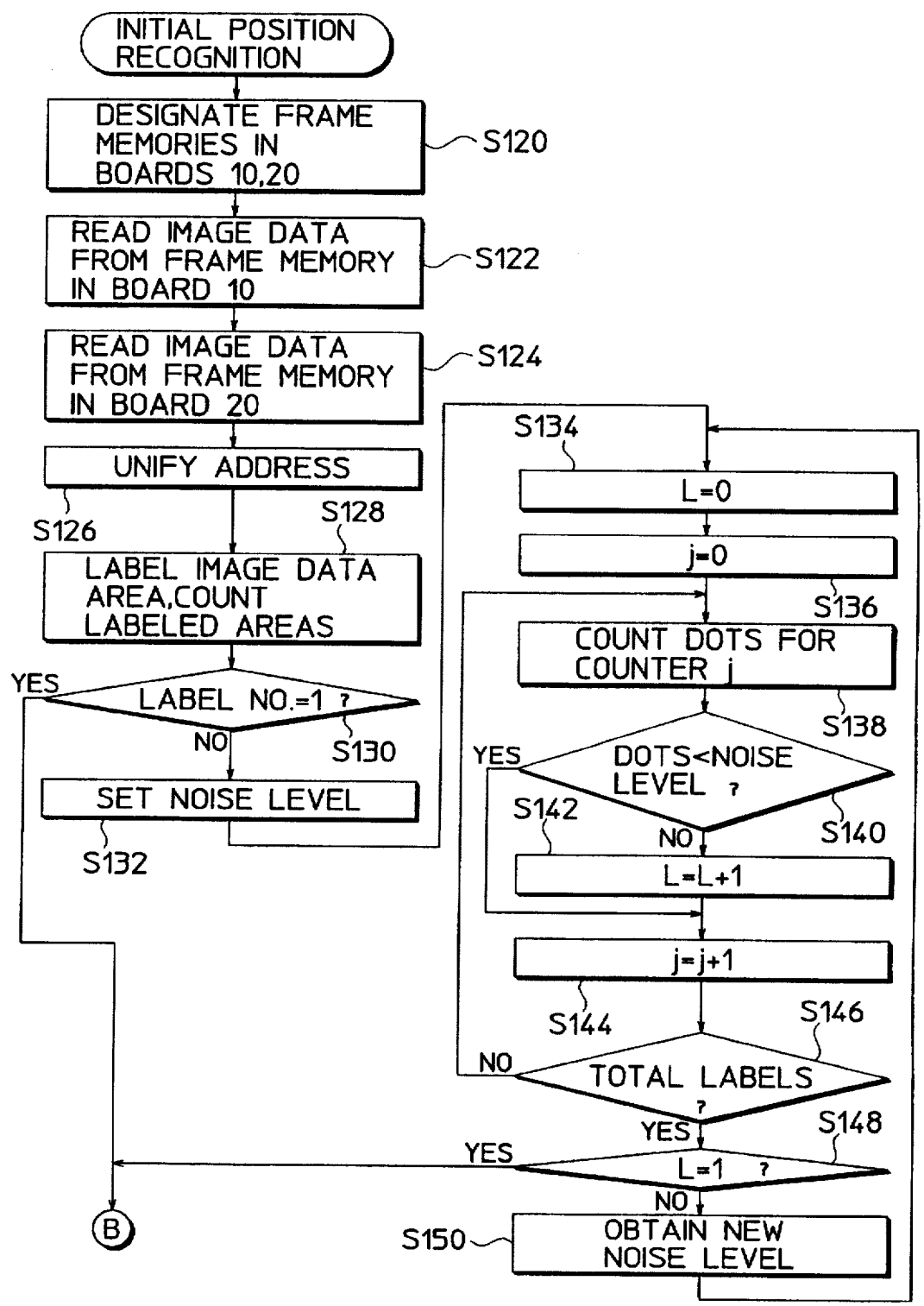
FIGS. 18 and 19 are a flowchart showing a subroutine "Initial Position Recognition"
Figure 19:
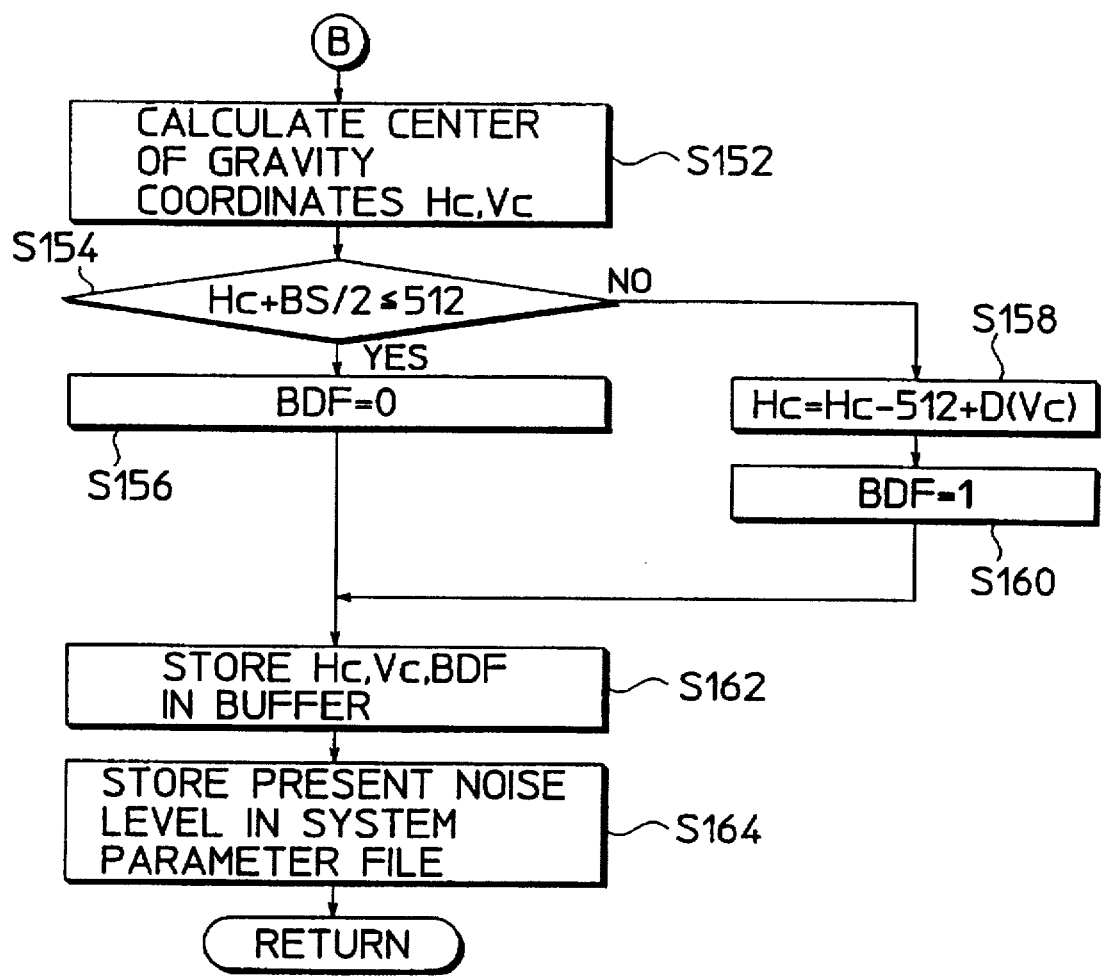

FIG. 18 is a flowchart showing a subroutine "Initial Position Recognition" carried out in Steps S48 and S54.

As described later, in tracing the cars 3, the processing is carried out in the data accumulating circuit 18 upon an interrupt. The center of gravity position calculation in the initial position recognition in Steps S46 and S54 is performed in this subroutine in order to securely prevent an erroneous calculation resulting from the presence of unnecessary reflection light, and the like.

First, one of the frame memories in the frame memory unit 11 and one of the frame memories in the frame memory unit 21 are selectively designated at the same time (Step S120). The image data in the frame memory 111 (or 112) in the board 10 is transferred into the RAM of the microcomputer 40 (Step S122). Subsequently, the image data in the frame memory 211 (or 212) in the board 20 is transferred into in the RAM of the microcomputer 40 (Step S124).

The microcomputer 40 unifies the addresses of the RAM using the distance D(v) (Step S126). Subsequently, the microcomputer 40 scans the image data after the address unification; detects the continuity of the dots (high level data) using a known method; labels the respective areas where the continuity is found; counts the labeled areas; and stores the counted label number (Step S128).

Subsequently, it is judged whether the label number is 1 (Step S130). If the label number is 2 or greater (NO in Step S130), a noise level value in a system parameter is set (Step S132). The effective label number counter L and the label counter j are set to 0, respectively (Steps S134 and S136). The dots are counted for the label corresponding to the count value O of the label counter j (Step S138). It is then judged whether the counted dot number is below the noise level (Step S140). If the dot number is not smaller than the noise level (NO in Step S140), the effective label counter L is incremented by 1 (Step S142) upon the assumption that this label is an effective label, and this subroutine proceeds to Step S142. Unless otherwise (YES in Step S140), this routine directly proceeds to Step S144 in which the label counter j is incremented. It is then judged whether the count value of the label counter j has reached the total label number (Step S146). Unless the count value of the counter j has reached the total label number (NO in Step S146), this routine returns to Step S138 to detect the number of the effective labels. If the count value of the counter j has reached the total label number (YES in Step S146), it is judged whether the count value of the counter L is 1 (Step S148). If the count value of the counter L is in excess of 1

(NO in Step S148), a new noise level having a higher threshold level which is obtained by adding 1 to the previous noise level upon the assumption that noises are still included (Step S150). Thereafter, this subroutine returns to Step S134 to carry out the aforementioned operations. This subroutine proceeds to Step S152 when the count value of the counter L becomes 1. In Step S152, the center of gravity coordinates Hc, Vc are calculated assuming that one effective label is the front LED 318 (or the rear LED 319). The center of gravity coordinates (Hc, Vc) are calculated from the following equation: Hc =a total value in H-coordinates/ dot number, Vc =a total value in V-coordinates/dot number.

Subsequently, it is judged whether it is possible to properly set the trace block BL for the center of gravity Hc, and a specified processing is executed based on the judgment result. Specifically, it is judged whether Hc+BS/2≦512 (Step S154). If Hc+BS/2 is not larger than 512 (YES in Step S154), the board identification flag BDF is set at "0"(Step S156). If Hc+BS/2 is larger than 512 (NO in Step S154), the calculation: Hc=Hc−512+D(v) is executed (Step S158), and the board identification flag BDF is set at "1"(Step S160). It should be noted that the board identification flag BDF "0" indicates that the position of the car 3 is detected by the board 10, whereas the board identification flag BDF "1" indicates that the position of the car 3 is detected by the board 20.

The above calculation result and the contents of the board identification flag BDF are stored in the buffer (Step S162). The noise level at this stage is stored as a system parameter (Step S164), and this subroutine returns.

In Step S130, on the other hand, if the label number is 1 (YES in Step S130), the center of gravity coordinates Hc, Vc are calculated assuming that one effective label is the front LED 318 (or the rear LED 319) (Step S152), and the calculation result and the contents of the board identification flag BDF are stored in the buffer (Step S162). The noise level at this stage is stored as a system parameter (Step S164), and this subroutine returns.

FIG. 16 is a flowchart showing the operations carried out in response to Interrupts I and II, particularly after the interrupt is enabled in Step S68.

Figure 20:
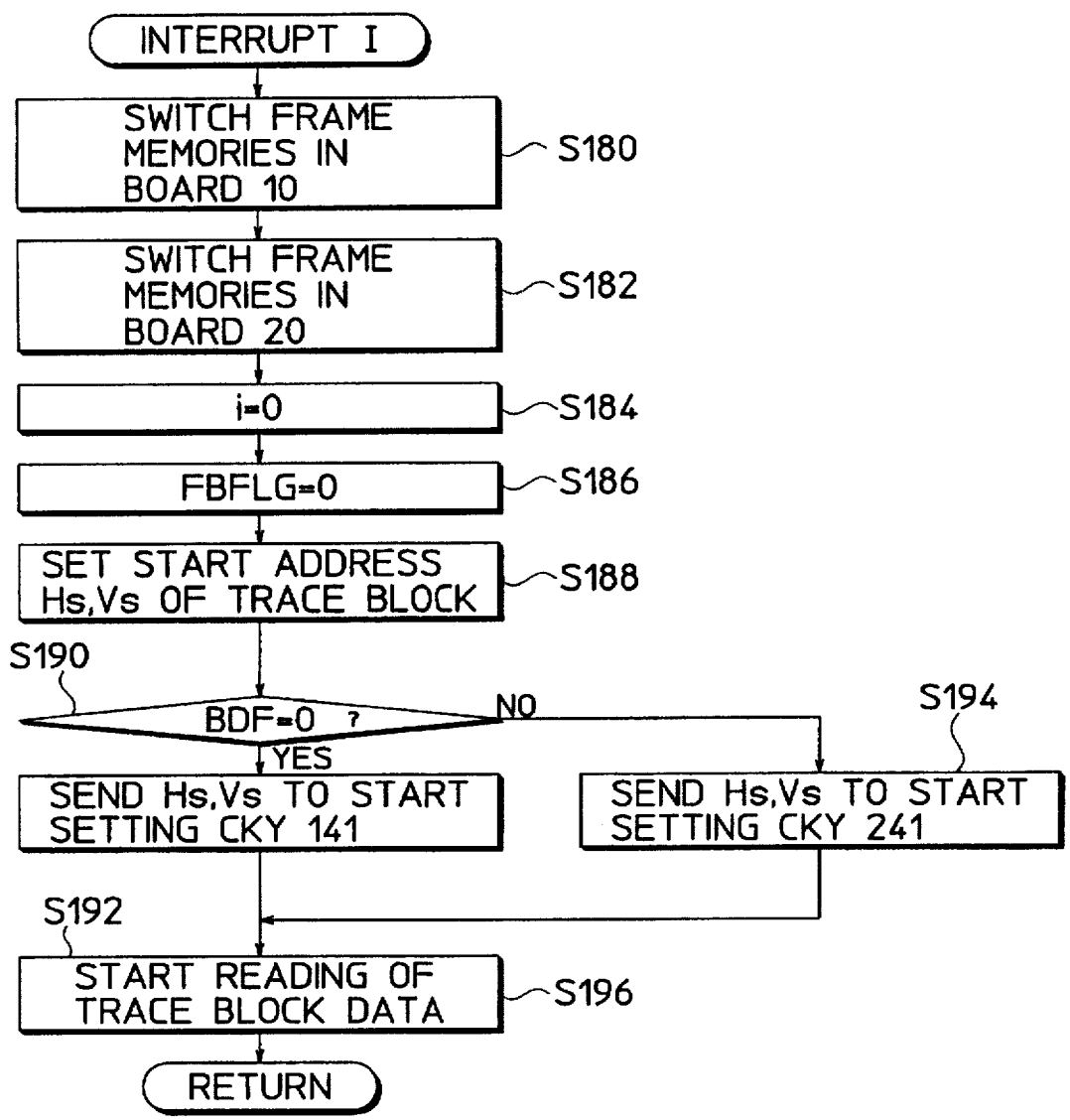
FIG. 20 is a flowchart showing a subroutine "Interrupt I"

The Interrupt I is described with reference to FIG. 20. The Interrupt I is started in response to an interrupt signal generated each time the reading of the image data in the frame memory units 11 and 21 in the boards 10 and 20 is completed. First, the frame memory unit 11 in the board 10 is switched to the frame memory 111 (or 112) in which the image data writing is completed (Step S180), and the frame memory unit 21 in the board 20 is switched to the frame memory 211 (or 212) in which the image data writing is completed (S182). Subsequently, the identification number ID No.i is set to 0 (Step S184), and the front and rear flag FBFLG is set to 0, i.e., the flag is set to the front LED 318 (Step S186).

Subsequently, the start address (Hs, Vs) of the trace block labelled in correspondence with the front LED 318 of the car of ID No. 0 is set (Step S188). In other words, $Hs=FH[i]-(BS/2)+AFH[i]$ $Vs=FV[i]-(BS/4)+AFV[i]$ The correction amounts AFH[i] and AFV[i] are given by implementing the flowchart of Interrupt II.

Figure 24:
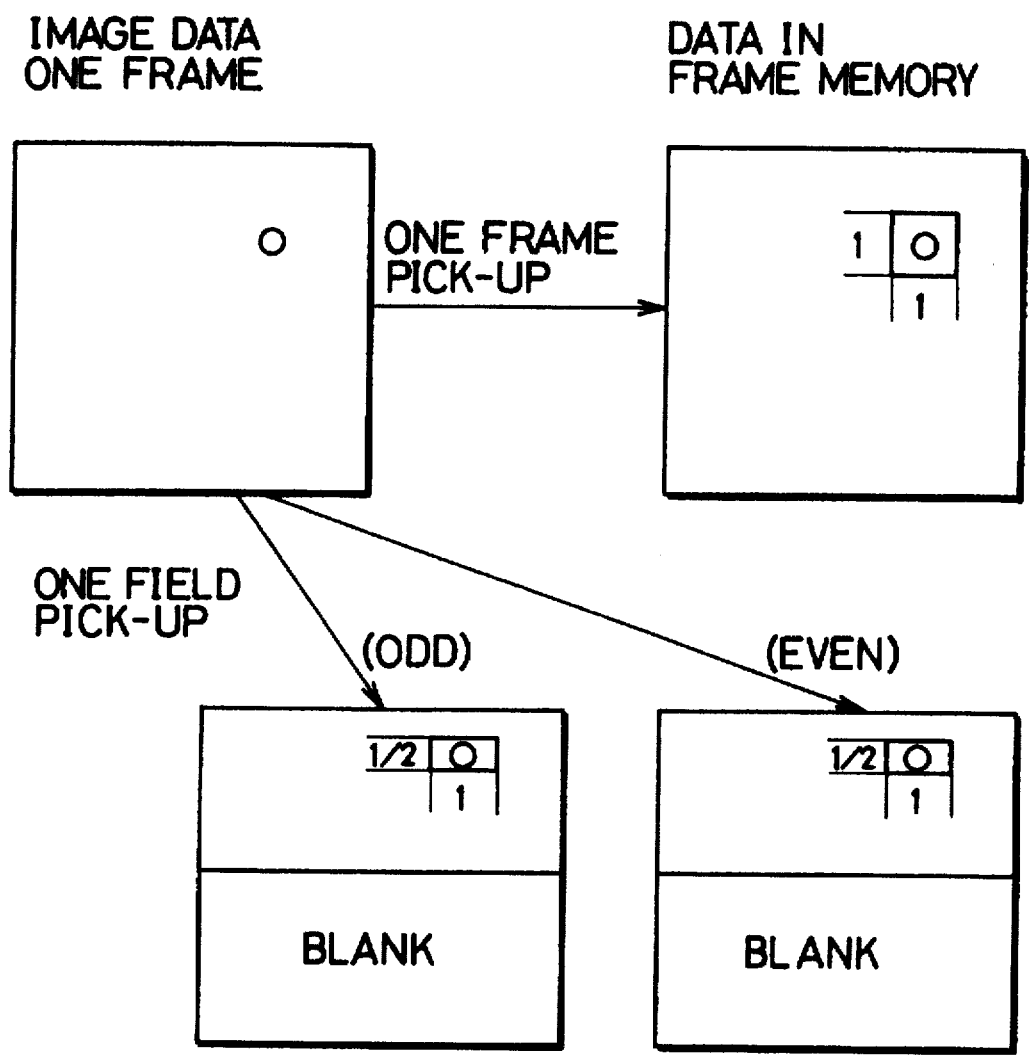
FIG. 24 is a diagram showing that image data in the frame memory are converted into binary data by the frame, whereas the number of a scanning line is ½.

As shown in FIG. 24, a quotient is set at 4 in the address Vs in view of the fact that there is ½ scanning line although the image stored in the frame memory is read as a binary data by the frame. In this way, a square trace block can be obtained.

Subsequently, it is judged based on the board identification flag BDF whether the front LED 318 of the car of the ID No. 0 is detected by the boards 10 or by the board 20 (Step S190). If the board identification flag BDF is "0"(YES in Step S190), it is judged that the front LED 318 of the car of the ID NO. 0 is detected by the board 10, and the start address (Hs, Vs) set at Step S188 is output to the start setting circuit 141 of the board 10 (Step S192).

On the other hand, if the board identification flag BDF is "1"(NO in Step S190), it is judged that the front LED 318 is detected by the board 20, and the start address (Hs, Vs) set at Step S188 is output to a start setting circuit 241 in the board 20 (Step S194). This subroutine returns after the reading of the data in the trace block is started (Step S196). The reading of the data for the front LED 318 of the car 3 of ID No. 0 is carried out in the data accumulating circuit 18 in the board 10 or in the data accumulating circuit 28 in the board 20.

By setting the start address (Hs, Vs) such that the position of the LED 318 (or 319) is located in the center of the trace block, the movement of the car 3 can securely be traced after one frame cycle independently of the running direction of the car 3, in other words, independently of the car 3 running in any angle in 360 degrees over the plane.

Particularly, since the correction amount set based on the running speed and the direction factor is considered as described later, the tracing can be made more secure. Instead of setting a specified traceable correction amount based on the preset highest speed of the car 3, the correction amount may be changed real-time depending upon the present running speed of the car 3 (obtained by dividing a difference between the detected positions in the last 2 frames by the frame cycle). This enables the front and rear LEDs 318 and 319 to be located as close to the center of the trace block as possible, thereby preventing the tracing error.

Figure 21:
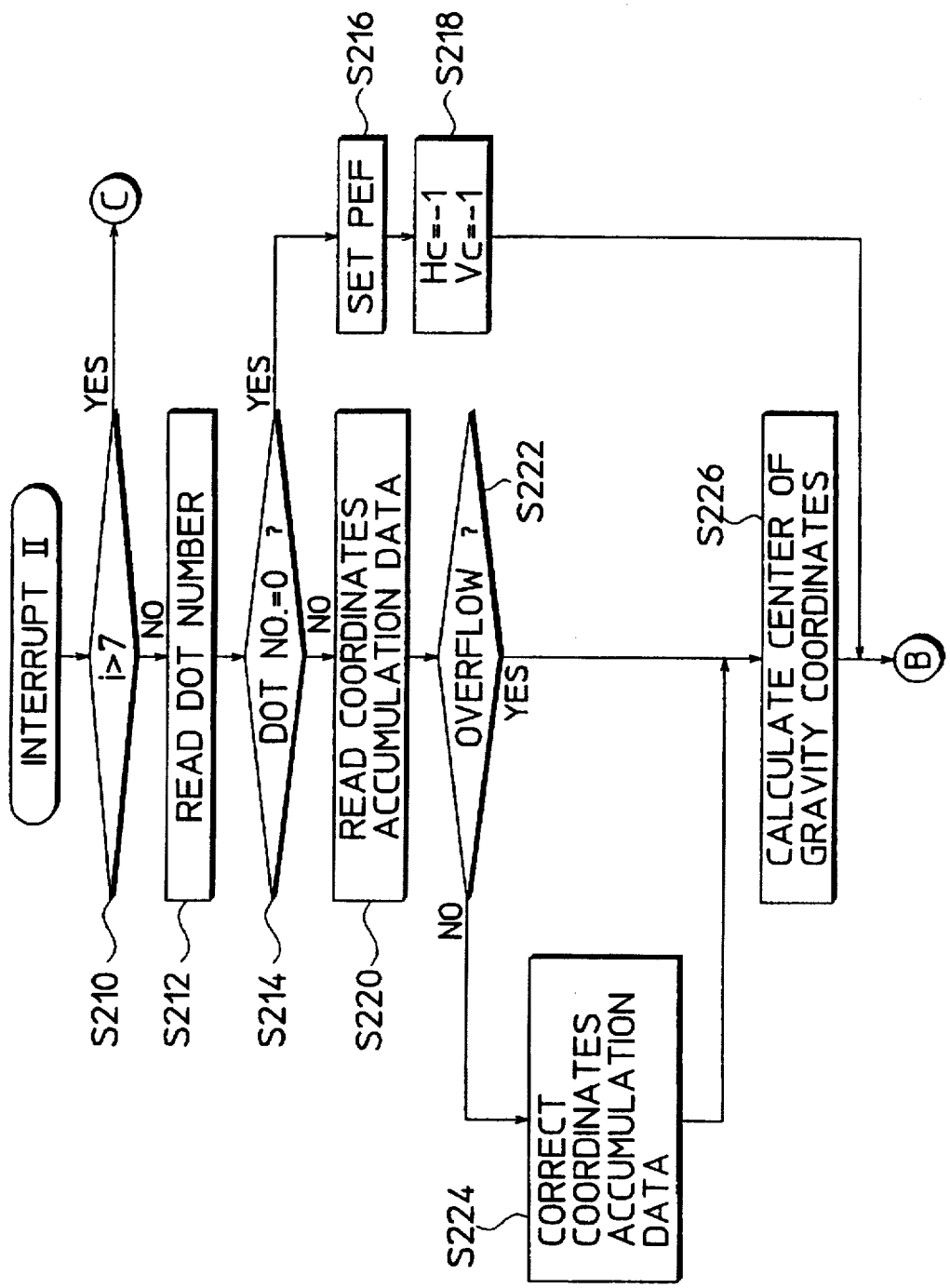
FIGS. 21 to 23 are a flowchart showing a subroutine "Interrupt II"
Figure 22:
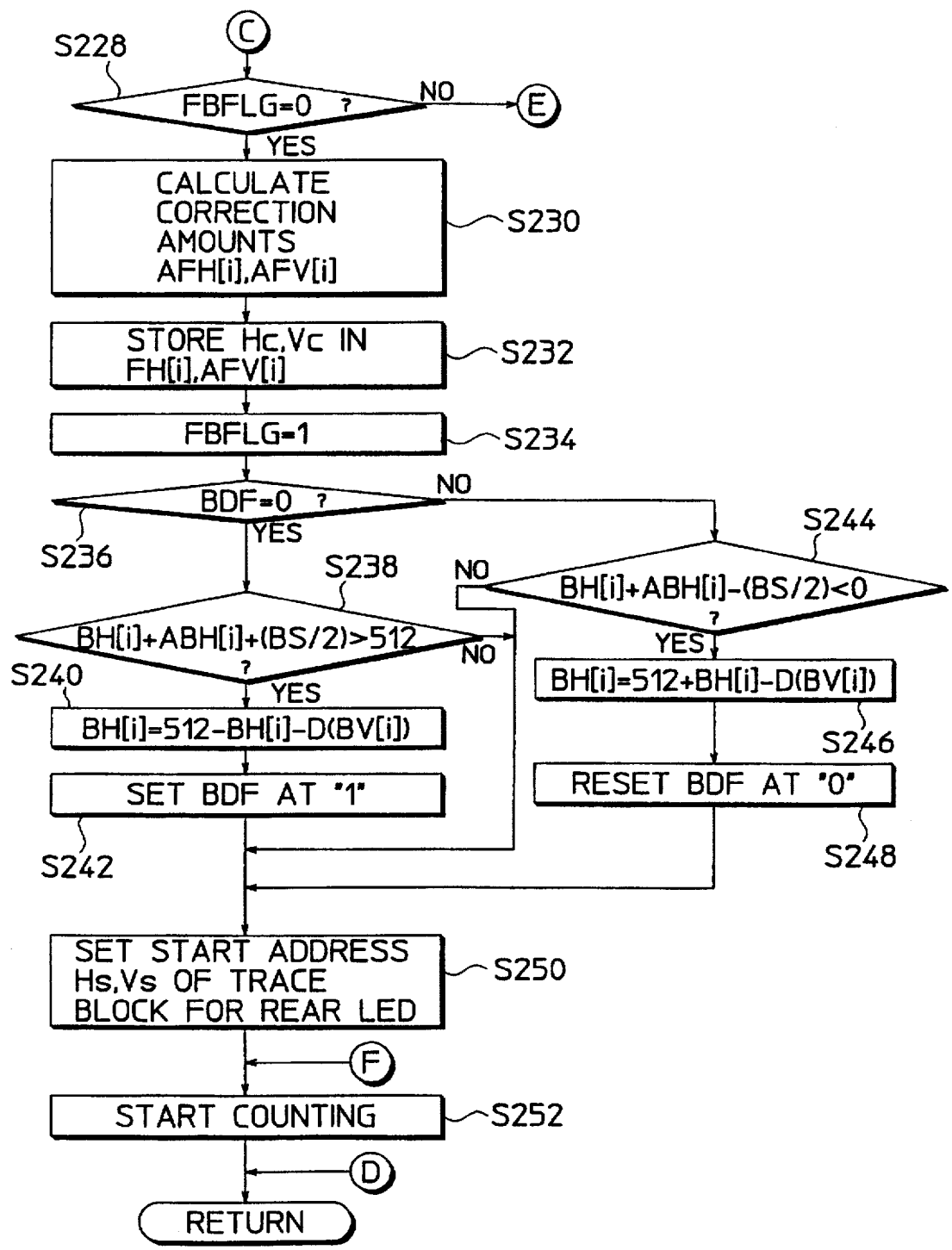
Figure 23:
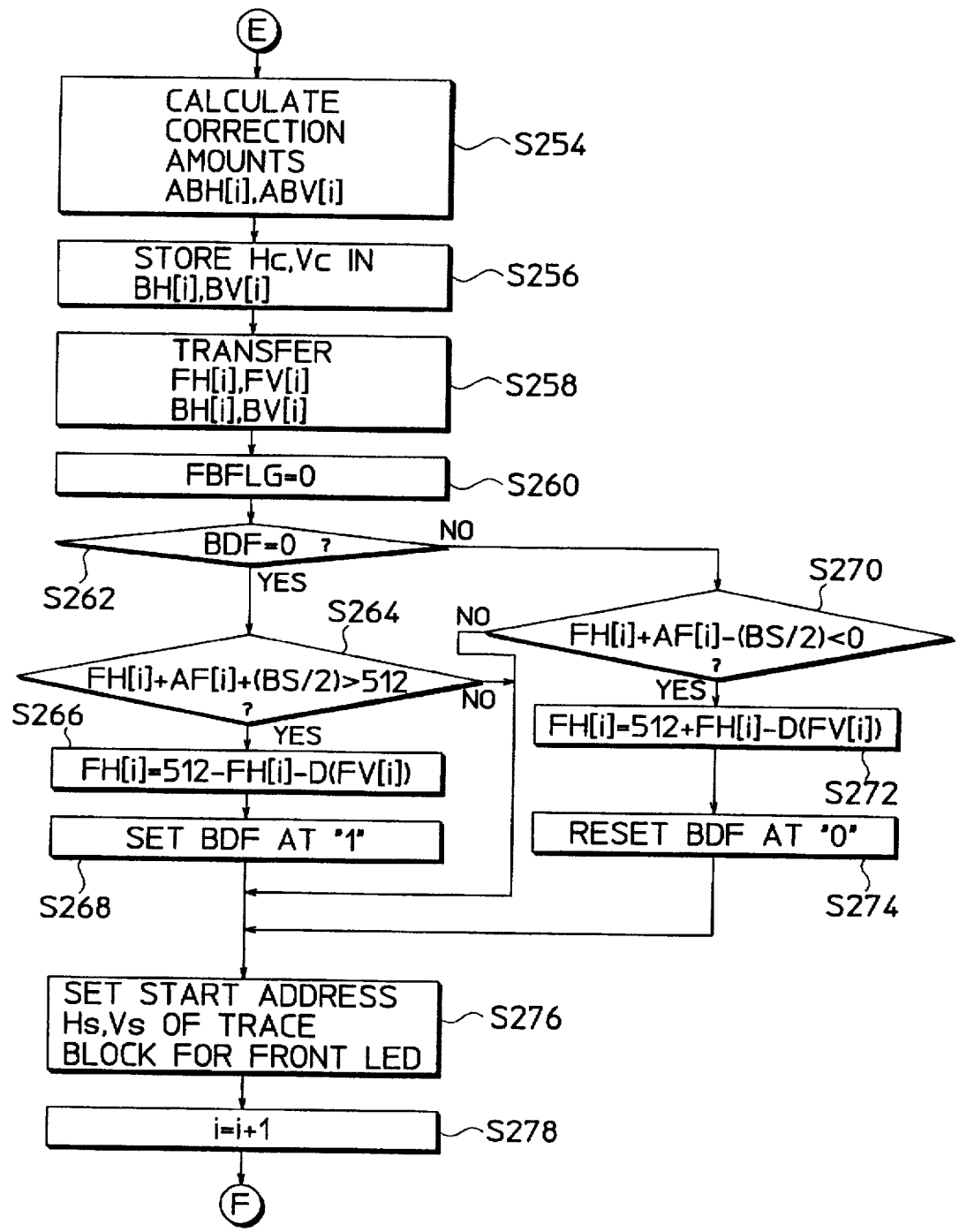

FIGS. 21 to 23 are flowcharts showing the Interrupt II.

The Interrupt II is started in response to an interrupt signal generated each time the address designation of the trace block by the H-, V-counter 142 (242) is completed. First, it is judged whether the count value of the counter i is smaller than 7 (Step S210). If this count value is not smaller than 7 (YES in Step S210), this routine returns upon the judgment that the tracing has been completed within one frame.

First, the position of the front LED 318 of the car 3 of ID No. 0 is detected. If the count value of the counter i is smaller than 7 (NO in Step S210), the dot number is read from the dot counter 183 (Step S212). It is then judged whether the dot number is 0 (Step S214). If the dot number is 0, a position tracing error flag PEF is set (Step S216), and (Hc, Vc) =(−1, −1) are set as a specific position data (Step S218). A position tracing error can be confirmed by this data or by monitoring the error flag PEF, and an alarm is given upon detecting the tracing error. Alternately, the trace block may be made larger than a predetermined size in case of such errors, so that the tracing can be further continued.

On the other hand, if the dot number is not 0, the coordinates accumulation data in the H- and V-directions are read from the latch circuit 182 upon the assumption that the tracing was completely made (Step S220). At this time, if the latch circuit 182 undergoes an overflow (NO in Step S222), the coordinates accumulation data are corrected (Step S224). This correction is made, for example based on the previous center of gravity position of the LED 318 (or 319) and the running speed of the car 3, probably considering the fact that the coordinates value is large to the extent that the latch circuit 182 undergoes the overflow. On the other hand, unless the latch circuit 182 undergoes the overflow, the center of gravity coordinates in the H-, V-coordinate system are calculated based on the following equation: Hc =accumulated value in the H-direction/dot number and Vc =accumulated value in the V-direction/dot number (Step S226). It is then judged whether the front and rear flag FBFLG is reset (Step S228).

If the flag FBFLG is reset (YES in Step 228), it means that the position of the front LED 318 is to be detected. Accordingly, correction amounts AFH[i], AFV[i] for the trace block in the H-, and V-directions are calculated based on the Hc, Vc calculated in Step S226 and the previously calculated value FH[i], FV[i]: AFH[i]=a moved amount in the H-direction ×α, AFV[i]=a moved amount in the V-direction ×β(Step S230). The moved amounts in the respective H- and V-directions are obtained: FH[i]–Hc, FV[i]–Vc. Correction coefficients α, β are any values between 0 and 1, and are set to specified values in view of the set speed of the car 3, the size of the trace block, etc. The values Hc, Vc are stored in FH[i], FV[i] corresponding to the front LED 318 (Step S232).

Upon the completion of the storage the flag FBFLG is set at "1", i.e., the starting address is set at the rear LED 319 (Step S234). Subsequently, it is judged whether the board identification flag BDF is set at "0"(Step S236). If the board identification flag BDF is set at "0", it is judged that the rear LED 319 is detected by the board 10. Then, it is judged whether BH[i]+ABH[i]+BS/2>512 in setting the trace block for the previously calculated value BH[i](Step S238). If BH[i]+ABH[i]+BS/2 is larger than 512 (YES in Step S238), the calculation: BH[i]=512–D(BV[i])–BH[i] is executed, because the trace block is outside the frame memory unit 11 (Step S240), and the board identification flag BDF is set at "1"(Step S242). On the contrary, if BH[i]+ABH[i]+BS/2 is not larger than 512 (NO in Step S238), setting of trace block is enabled in the frame memory unit 11, and this subroutine proceeds to Step S250.

If the board identification flag BDF is set at "1"(NO in Step S236), on the other hand, it is judged that the rear LED 319 is detected in the board 20. Then, it is judged whether BH[i]+ABH[i]–BS/2 <0 in setting the trace block for the previously calculated value BH[i](Step S244). If BH[i]+ABH[i]–BS/2 is smaller than 0 (YES in Step S244), the calculation: BH[i]=512–D (BV[i])+BH[i] is executed, because the trace block is outside the frame memory unit 21 (Step S246), and the board identification flag BDF is reset at "0"(Step S248). On the contrary, if BH[i]+ABH[i]–BS/2 is not smaller than 0 (NO in Step S244), the trace block is settable in the frame memory unit 21, and this subroutine proceeds to Step S250.

In Step S250, the start address (Hs, Vs) of the trace block for the rear LED 319 of the car 3 of ID No. i is set. In other words, the start address (Hs, Vs) is set using the following equations:

$$Hs=BH[i]-(BS/2)+ABH[i]$$

$$Vs=BV[i]-(BS/4)+ABV[i]$$

and the counting is started (Step S252).

On the other hand, if the flag FBFLG is set at "1" in Step S228, it means that the position of the rear LED 319 is to be detected. Accordingly, correction amounts ABH[i], ABV[i] for the trace block in the H-, and V-directions are calculated based on the Hc, Vc calculated in Step S226 and the previously corresponding calculated value BH[i], BV[i]: ABH[i]=a moved amount in the H-direction ×α, ABV[i]=a moved amount in the V-direction ×β(Step S254). The moved amounts in the respective H- and V-directions are obtained: BH[i]–Hc, BV[i]–Vc.

The values Hc, Vc are stored in BH[i], BV[i] corresponding to the rear LED 319 (Step S256).

Since the detection of the front and rear LEDs 318 and 319 of the car of ID No. i is completed, the calculated values FH[i], FV[i] and BH[i], BV[i] are temporarily transferred and stored as RFH[i], RFV[i], RBH[i], and RBV[i] in the buffer from which the data are readable in the main routine (Step S258).

Upon the completion of the transfer and storage, the flag FBFLG is reset, i.e., the position of the front LED 318 is to be detected (Step S260). Subsequently, it is judged whether the board identification flag BDF is set at "0"(Step S262). If the board identification flag BDF is set at "0"(YES in Step S262), it is judged that the front LED 318 is detected by the board 10. Then, it is judged whether FH[i]+AFH[i]+BS/2>512 in setting the trace block for the previously calculated value FH[i](Step S264). If FH[i]+AFH[i]+BS/2 is larger than 512 (YES in Step S264), the calculation: FH[i]+512+D(FV[i])–FH[i] is executed (Step S266), because the trace block is outside the frame memory unit 11, and the board identification flag BDF is set at "1"(Step S268). On the contrary, if FH[i]+AFH[i]+BS/2 is not larger than 512 (NO in Step S264), the trace block is settable in the frame memory unit 11, and this subroutine proceeds to Step S276.

If the board identification flag BDF is "1"(NO in Step S262), on the other hand, it is judged that the front LED 318 is detected by the board 20. Then, it is judged whether FH[i]+AFH[i]–BS/2 <0 in setting the trace block for the previously calculated value FH[i](Step S270). If FH[i]+AFH[i]–BS/2 is smaller than 0 (YES in Step S270), the calculation: FH[i]=512–D (FV[i])+FH[i] is executed (Step S272), because the trace block is outside the frame memory unit 21, and the board identification flag BDF is reset at "0"(Step S274). On the contrary, if FH[i]+AFH[i]–BS/2 is not smaller than 0 (NO in Step S270), the trace block is settable in the frame memory unit 21, and this subroutine proceeds to Step S276.

In Step S276, the start address (Hs, Vs) of the trace block for the front LED 318 of the car 3 of ID No. i is set. In other words, the start address (Hs, Vs) is set using the following equation:

$$Hs=FH[i]-(BS/2)+AFH[i]$$

$$Vs=FV[i]-(BS/4)+AFV[i]$$

the count value i is incremented by 1 (Step S278), and the counting is started (Step S252), thereby repeating the aforementioned operations for the trace block of the next car 3.

Referring back to FIG. 16, after transferring the calculated values upon the completion of the Interrupt II, the identification number ID No. i is set to 0 (Step S70), and any more interrupt is prohibited (Step S72). The position data of the front and rear LEDs 318 and 319, i.e., RFH[i], RFV[i] and RBH[i], RBV[i] are read from the buffer (Step S74). The interrupts are allowed again upon the completion of this reading (Step S76). Since the data transfer by the Interrupt II is repeated between Steps S68 and S90, Steps S72 and S76 are provided to prevent the reading of the erroneous data even if the reading of the data from the buffer and the data transfer by the Interrupt II are carried out at the same timing.

The relationship between the position of the car 3 and the front and rear LEDs 318, 319 is predetermined. For example, the position of the car 3 may be an intermediate position of the front and rear LEDs 318 and 319. Upon determining the position of the car 3, the race development data, i.e., a goal position data and the speed data are set (Step S78). The goal position data is given to each car, and is a position data for designating passing points on the race track RC at specified intervals.

The running direction of the car 3 is calculated based on the present goal position and the detected position of the car 3 (Step S80). Further, a direction correction amount of the car 3 is calculated based on a target direction (direction toward the goal position) and the facing direction of the car 3 (which is calculated based on the positions of the front and rear LEDs 318 and 319 of the car 3). If the goal direction is calculated based on the data in three points: the present position, the next position and the further next position, the car 3 is capable of running more smoothly along the predetermined course. The speed and the direction are instructed to the car 3 based only on a goal speed data. More specifically, the speed instruction is given to one of the specific wheels, e.g., the motor 313 for driving the wheel 311, and the direction instruction is given in the form of a speed difference from the rotating speed of the motor 313. The direction can also be controlled by individually instructing the rotating speeds to the respective motors 313 and 314.

The obtained goal speed data is transmitted to the car 3 of the corresponding ID number via the transmission LEDs 7 (Step S82), and the count value of the counter i is incremented by 1 (Step S84). It is then judged whether the count value of the counter i is larger than 7 (Step S86). This routine returns to Step S72 if this count value is not larger than 7. If this count value is larger than 7, a system reset signal is checked (Step S88). The system reset signal is output in the case where an abnormality occurs in the system or when the race finishes.

If the system reset signal is not reset (NO in Step S90), this routine returns to Step S70 in which the count value of the counter i is set to "0". In this way, the running control for the cars 3 is continued until the race finishes. On the other hand, if the system reset signal is reset, this routine ends upon the judgment that the race has finished.

Although the initial position recognition (Steps S46 and S54) and the position detection during the tracing are performed by the different circuits in this embodiment, they may be performed by the single circuit. Further, although the position recognition is performed by individually turning on the front and rear LEDs 318 and 319 in the initial position recognition, it may be performed as follows. First, only the front LED 318 is turned on, and the front and rear LEDs 318 and 319 are turned on at a next timing. The position of the rear LED 319 is recognized by omitting the already recognized position of the front LED 318. This method requires only three kinds of control signals for the front and rear LEDs 318 and 319: one for turning the both LEDs 318 and 319 off, one for turning only the front LED 318 on, and one for turning the both LEDs 318 and 319 on. Further, a waiting period may be set based on the factor other than the frame in order to prevent a delay between the timing at which the front and rear LEDs 318 and 319 are turned on and the image pick-up timing so that the image can be securely picked up while the LEDs 318 and 319 are on.

Although members for emitting and receiving infrared radiations are used as communication means between the car 3 and the machine main body in the foregoing embodiment, members for transmitting and receiving radio waves or ultrasonic waves may also be used.

Although the cars performing a car race are controlled in the foregoing embodiment, the invention is not limited to this. The invention may be applied to another race game such as a horse race or a boat race, or may be applied to control a specific movement of one movable object.

Further, the invention is not limited to the control for the movable object on the surface (including a curved surface), but may be applied to a control for a movable object which moves linearly along a line, fly or floats in the air or in the liquid.

Further, in the foregoing embodiments, when a portion of the trace block comes outside the frame memory, a new trace block is set in the opposite frame memory to enable tracing. However, a new trace block may be set when the trace block goes beyond the border line. Alternatively, a new trace block may be set when the running car 3 comes across the border line.

Although the trace block is used to detect the position of the running car 3 in the foregoing embodiment, the invention is not limited to this. The frame memory may be integrally scanned to detect the position, instead of the use of trace block. In this case, position detection data obtained from one of the frame memories is set in the form of a new address in the opposite frame memory on condition that the detected position of the car runs across the border line.

Although two area sensors are used in the foregoing embodiment, three or more area sensors may be used. In this case, furthermore, areas to be viewed by the area sensors may be defined into H-direction and V-direction separately. This will make it possible to adopt a desiredly shaped game base.

Further, the TV cameras 1, 2 may be disposed to face upward below the base P instead of the above base P, by using a transparent base P. In this case, if the devices for transmitting and receiving the signals are disposed such that the optical communication between the car 3 and the machine main body can be conducted via the base P, the game participants can enjoy the game on the base P.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A position detecting system for detecting without contact a position of a movable object moving on a plane and having a light emitter, the system comprising:

a first light image sensor which has a first view area and receives light from the light emitter of the movable object in the first view area to produce image data;

a second light image sensor which has a second view area and receives light from the light emitter of the movable object in the second view area to produce image data;

a combination of the first and second view areas covering said plane on which the movable object moves, and the first and second view areas overlapping each other in an overlap area wherein a borderline on said plane is defined; and a processor means for calculating a position of the movable object based on image data produced by the first and second light sensors, said processor means including:

first and second memories respectively provided for storing said image data of the first and second light image sensors according to respective local address systems of said first and second light image sensor and representing said first and second view areas; and a position calculator means for calculating a position of the movable object in the terms of a general address system unifying said local address systems of the first and second memories, the position calculator means including:

a border address calculating means for calculating border addresses of said borderline in the local address systems of the first and second memories, the border addresses corresponding to said border line defined in said overlap area of the first and second view areas; and an address converting means for converting addresses in the respective local address systems to those in the general address system based on the border addresses.

2. A position detecting system as defined in claim 1, wherein the position calculator means further includes:

a block designator means for designating an address block in the local address system of either the first memory or the second memory, the designated address block covering addresses bearing image data of the emitter provided on the movable object;

a reader which reads image data within the designated address block; and a object position calculating means for calculating a position of the movable object within said address block based on the read image data.

3. A position detecting system as defined in claim 2, wherein:

said block designator means designates said address block in the local address system of the first memory when a portion of an address block having been designated in the local address system of the second memory is beyond the border addresses of the second memory, and designates said address block in the local address system of the second memory when a portion of an address block having been designated in the local address system of the first memory, is beyond the border addresses of the first memory.

4. A position detecting system as defined in claim 2, wherein:

each of the first and second light sensors includes an area sensor provided with photoelectric conversion elements arranged in a matrix; and the object position calculating means includes:

a counting portion which counts the number of photoelectric conversion elements which have received light from the light emitter of the movable object based on the image data read by the reader;

a coordinate value accumulating portion which accumulates coordinate values of the photoelectric conversion elements counted by the counting portion; and a calculating portion which calculates a position of the movable object based on the counted number and the accumulated coordinate values.

5. A position detecting system as defined in claim 2, wherein the block designator means includes:

a moved amount calculating means for calculating a moved amount of the movable object based on the calculated position of the movable object; and a designating means for designating an address block based on a previously calculated position of the movable object and the calculated moved amount.

6. A position detecting system as defined in claim 1, wherein each of the first and second light sensors is provided with a lens for focusing a light image on a surface of the light sensor.

7. A position detecting system as defined in claim 1, wherein the light emitter is operable to emit light lying outside a frequency band for visible radiations; and each of the first and second light sensors is operable to receive only light lying in the same frequency band of light emitted by the light emitter.

8. A position detecting system for detecting without contact a position of a movable object moving on a plane and having a light emitter, the system comprising:

a first light image sensor which has a first view area and receives light from the light emitter of the movable object in the first view area to produce image data;

a second light image sensor which has a second view area and receives light from the light emitter of the movable object in the second view area to produce image data;

a combination of the first and second view areas covering said plane on which the movable object moves, and the first and second view areas overlapping each other in an overlap area wherein a substantially straight borderline on said plane between the first and second view areas is defined; and a processor means for calculating a position of the movable object based on image data produced by the first and second light sensors, said processor means including:

first and second memories respectively provided for storing said image data of the first and second light image sensors according to respective local address systems of said first and second light image sensor and representing said first and second view areas;

a border address calculating means for calculating border addresses of said substantially straight borderline in the local address systems of the first and second memories, the border addresses corresponding to curved borderlines in said local address systems due to distortion by the first and second light image sensors;

a distortion compensation means for calculating address deviations due to said distortion; and a position calculator means for calculating a position of the movable object in the terms of a general address system unifying said local address systems of the first and second memories, the position calculator means including an address converting means for converting addresses in the respective local address systems to those in the general address system based on the border addresses and for correcting for said distortion by removing said address deviations from the position of the movable object in the general address system.

* * * * *